US012355177B2

(12) United States Patent
Takeuchi

(10) Patent No.: US 12,355,177 B2
(45) Date of Patent: Jul. 8, 2025

(54) CONNECTOR AND CONNECTOR MANUFACTURING METHOD

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Shunya Takeuchi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 500 days.

(21) Appl. No.: 17/909,972

(22) PCT Filed: Feb. 22, 2021

(86) PCT No.: PCT/JP2021/006604
§ 371 (c)(1),
(2) Date: Sep. 7, 2022

(87) PCT Pub. No.: WO2021/182093
PCT Pub. Date: Sep. 16, 2021

(65) Prior Publication Data

US 2023/0119493 A1 Apr. 20, 2023

(30) Foreign Application Priority Data

Mar. 12, 2020 (JP) ................................ 2020-043009

(51) Int. Cl.
*H01R 13/00* (2006.01)
*H01R 13/42* (2006.01)
(Continued)

(52) U.S. Cl.
CPC ............ *H01R 13/42* (2013.01); *H01R 13/50* (2013.01); *H01R 13/516* (2013.01); *H01R 43/20* (2013.01)

(58) Field of Classification Search
CPC ....... H01R 13/50; H01R 13/516; H01R 43/20
See application file for complete search history.

(56) References Cited

U.S. PATENT DOCUMENTS 6,827,613 B2 * 12/2004 Ferderer ............... H01R 24/28 439/805
7,905,744 B1 * 3/2011 Amidon ............ H01R 13/5812 439/417
(Continued)

FOREIGN PATENT DOCUMENTS

JP 2014-032861 A 2/2014

OTHER PUBLICATIONS

International Search Report issued on May 18, 2021 for WO 2021/182093 A1 (4 pages).

*Primary Examiner* — Phuong Chi Thi Nguyen
(74) *Attorney, Agent, or Firm* — Venjuris, P.C.

(57) ABSTRACT

A connector 10 is provided with a terminal 12 to be connected to a core wire 13 located on an end part of a wire 11 including the core wire 13, and a housing 30 including an accommodating portion 29 for accommodating the terminal 13. The terminal 12 includes a terminal body 15 having a sandwiching portion 18 and a slide portion 16 for sandwiching the core wire 13 by the sandwiching portion 18 by being pressed and slid from behind with respect to the terminal body 15. The housing 30 includes an opening 32. The opening 32 exposes a part of a front end part of the terminal body 15 to front.

9 Claims, 18 Drawing Sheets

(51) Int. Cl.

| | |
|---|---|
| ***H01R 13/50*** | (2006.01) |
| ***H01R 13/516*** | (2006.01) |
| ***H01R 43/20*** | (2006.01) |

(56) References Cited

U.S. PATENT DOCUMENTS

| | | | | |
|---|---|---|---|---|
| 9,172,171 | B2 | 10/2015 | Nemoto | |
| 2004/0087209 | A1 | 5/2004 | Nakamura | |
| 2005/0026515 | A1 | 2/2005 | Hashimoto et al. | |
| 2019/0252803 | A1 | 8/2019 | Takeuchi et al. | |
| 2019/0252815 | A1* | 8/2019 | Hara .................. | H01R 13/4362 |

* cited by examiner

CONNECTOR AND CONNECTOR MANUFACTURING METHOD

CROSS REFERENCE TO RELATED APPLICATIONS

This application is a national phase of PCT application No. PCT/JP2021/006604, filed on 22 Feb. 2021, which claims priority from Japanese patent application No. 2020-043009, filed on 12 Mar. 2020, all of which are incorporated herein by reference.

TECHNICAL FIELD

The present disclosure relates to a connector and a connector manufacturing method.

BACKGROUND

Conventionally, a wire with terminal is known in which a terminal is connected to a core wire exposed from an end of a wire. Such a terminal may include a crimping portion to be crimped to the core wire on the end of the wire from outside as disclosed in Japanese Patent Laid-open Publication No. 2005-050736 (Patent Document 1).

The above terminal is crimped to the wire, for example, as follows. First, the terminal of a predetermined shape is formed by press-working a metal plate material. Subsequently, the terminal is placed on a placing section of a lower mold located on a lower side, out of a pair of molds relatively movable in a vertical direction. Then, the core wire on the end of the wire is placed to overlap the crimping portion of the terminal. Thereafter, one or both of the pair of molds are moved in mutually approaching directions, thereby sandwiching the crimping portion between a crimping section of the upper mold and the placing section of the lower mold to crimp the crimping portion to the core wire of the wire. In the above way, the terminal is crimped to the end of the wire.

PRIOR ART DOCUMENT

Patent Document

Patent Document 1: JP 2005-050736 A

SUMMARY OF THE INVENTION

Problems to be Solved

In the case of sandwiching and connecting a core wire by a slide structure instead of the above crimping portion, a terminal is possibly composed of two components including a terminal body and a slide portion to be mounted while being relatively slid with respect to the terminal body. If the slide portion is pressed and slid in a state where such a terminal is accommodated inside a housing and the terminal body is held not to move in a sliding direction, the housing and the terminal body may be deformed by a force applied to the slide portion.

The present disclosure was completed on the basis of the above situation and aims to provide a technique for suppressing the deformation of a housing and a terminal body and sandwiching and connecting a core wire by a slide structure.

Means to Solve the Problem

The present disclosure is directed to a connector with a terminal to be connected to a core wire located on an end part of a wire including the core wire, and a housing including an accommodating portion for accommodating the terminal, the terminal including a terminal body having a sandwiching portion and a slide portion for sandwiching the core wire by the sandwiching portion by being pressed and slid from behind with respect to the terminal body, the housing including an opening, and the opening exposing a part of a front end part of the terminal body to front.

Effect of the Invention

According to the present disclosure, it is possible to suppress the deformation of a housing and a terminal body and sandwich and connect a core wire by a slide structure.

DETAILED DESCRIPTION TO EXECUTE THE INVENTION

Description of Embodiments of Present Disclosure

Figure 1:
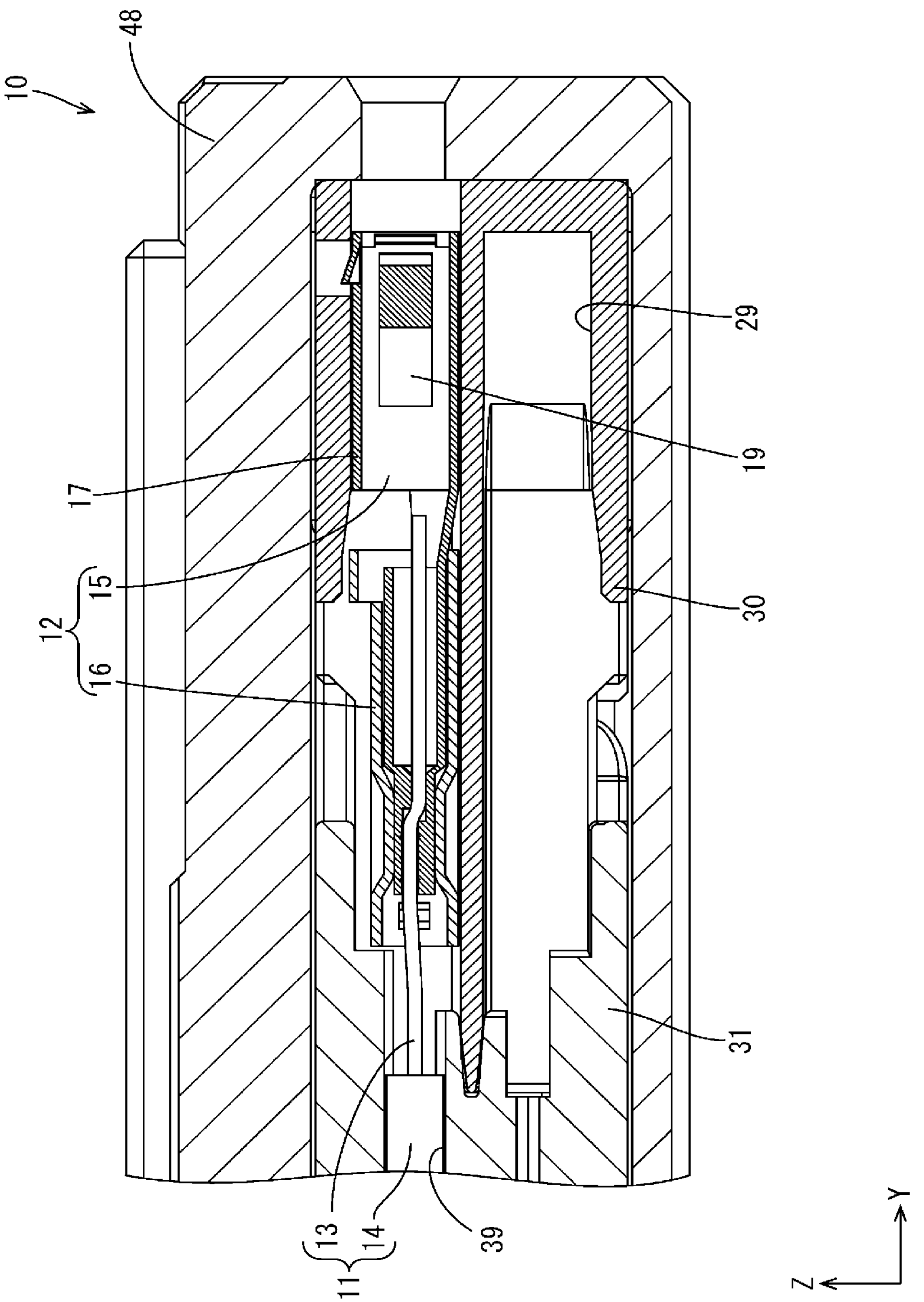
FIG. 1 is a section of a connector according to a first embodiment.

First, embodiments of the present disclosure are listed and described.

(1) The connector of the present disclosure is provided with a terminal to be connected to a core wire located on an end part of a wire including the core wire, and a housing including an accommodating portion for accommodating the terminal, the terminal including a terminal body having a sandwiching portion and a slide portion for sandwiching the core wire by the sandwiching portion by being pressed and slid from behind with respect to the terminal body, the housing including an opening, and the opening exposing a part of a front end part of the terminal body to front.

According to the above configuration, by inserting the front pressing jig into the opening from front and bringing the front pressing jig into contact with the terminal body, the deformation of the housing and the terminal can be suppressed when the slide portion is slid by being pressed from behind, and the core wire can be sandwiched and connected by a slide structure.

(2) Preferably, the terminal body includes a connecting tube portion, the connecting tube portion has a first wall portion provided with a contact piece configured to contact a mating terminal inserted into the connecting tube portion, and the housing includes a front stop portion for covering at least a part of a front end part of the first wall portion.

According to the above configuration, the contact piece can be protected when the front pressing jig is inserted into the opening and when the mating terminal is inserted into the connecting tube portion.

(3) Preferably, the connecting tube portion has a second wall portion facing the first wall portion and a third wall portion and a fourth wall portion connecting both side edge parts of the first wall portion and both side edge parts of the second wall portion, and the opening exposes a part of a front end part of the third wall portion, a part of a front end part of the fourth wall portion and a front end part of the second wall portion.

According to the above configuration, the front pressing jig can be brought into contact with a part of the front end part of the third wall portion, a part of the front end part of the fourth wall portion and the front end part of the second wall portion.

(4) Preferably, an inner surface facing the second wall portion, out of inner surfaces constituting the accommodating portion, serves as a second surface portion, and the second surface portion is provided with a protrusion configured to come into contact with the second wall portion.

(5) Preferably, an inner surface facing the second wall portion, out of inner surfaces constituting the accommodating portion, serves as a second surface portion, and the second surface portion is connected to the opening via a step surface.

According to the above configurations, the front end part of the second wall portion is easily contacted by the front pressing jig since the front pressing jig approaches a center from an outer edge of a region where the front pressing jig is inserted.

(6) Preferably, the connecting tube portion has a second wall portion facing the first wall portion and a third wall portion and a fourth wall portion connecting both side edge parts of the first wall portion and both side edge parts of the second wall portion, the front stop portion covers a front end part of the fourth wall portion, and the opening exposes a part of a front end part of the third wall portion and a part of a front end part of the second wall portion.

According to the above configuration, the front pressing jig can be brought into contact with a part of the front end part of the third wall portion and a part of the front end part of the second wall portion.

(7) Preferably, the third wall portion is provided with a locking lance, and the housing is provided with a locking wall to be locked to the locking lance, the locking wall facing forward via the opening.

According to the above configuration, the front end part of the third wall portion is easily contacted by the front pressing jig since the front pressing jig approaches a center from an outer edge of a region where the front pressing jig is inserted.

(8) Preferably, the housing is covered by a cover, and the cover covers the opening from front and includes a guiding portion for guiding insertion of a mating terminal into the terminal body.

According to the above configuration, the insertion of the mating terminal into the terminal body is facilitated.

(9) Preferably, the slide portion is movable in a front-rear direction between a first position and a second position forward of the first position while being externally fit to a region where the sandwiching portion is provided, the slide portion includes a pressurizing portion for pressing the sandwiching portion toward the core wire at the second position, and the slide portion is provided with a press receiving portion for moving the slide portion from the first position to the second position by being pressed from behind.

According to the above configuration, a state where the core wire is sandwiched by the sandwiching portion can be held by fixing the slide portion at the second position.

(10) A connector manufacturing method of the present disclosure is a manufacturing method for a connector with a terminal to be connected to a core wire located on an end part of a wire including the core wire and a housing including an accommodating portion for accommodating the terminal, the terminal including a terminal body having a sandwiching portion and a slide portion for sandwiching the core wire by the sandwiching portion by being pressed and slid from behind with respect to the terminal body, the housing including an opening, and the opening exposing a part of a front end part of the terminal body to front, and the connector manufacturing method includes accommodating the terminal into the accommodating portion of the housing, inserting the wire having the core wire exposed therefrom into the terminal body, bringing a front pressing jig into contact with a part of a front end part of the terminal body exposed to front in the opening from front, and sandwiching the core wire of the wire by the sandwiching portion of the terminal body by pressing the slide portion from behind.

According to the above connector manufacturing method, it is possible to suppress the deformation of the housing and the terminal body and sandwich and connect the core wire by a slide structure.

Details of Embodiments of Present Disclosure

Embodiments of the present disclosure are described below. The present disclosure is not limited to these illustrations and is intended to be represented by claims and include all changes in the scope of claims and in the meaning and scope of equivalents.

First Embodiment

A first embodiment of the present disclosure is described with reference to FIGS. 1 to 13. In the following description, an X direction, a Y direction and a Z direction in FIGS. 1 to 13 are referred to as a leftward direction, a forward direction and an upward direction. Note that, for a plurality of identical members, only some members may be denoted by a reference sign and other members may not be denoted by the reference sign.

[Connector]

Figure 2:
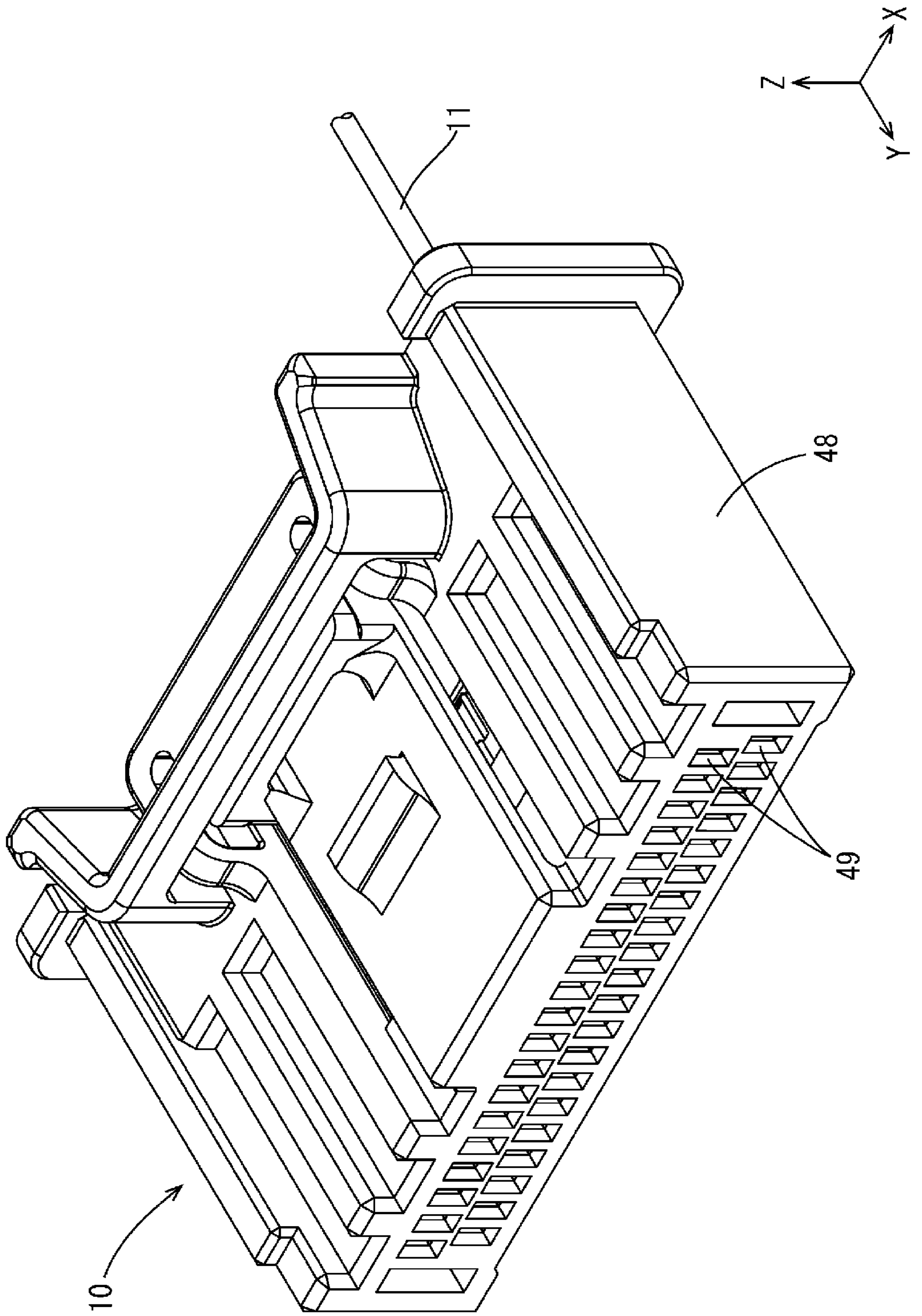
FIG. 2 is a front perspective view of the connector according to the first embodiment.
Figure 3:
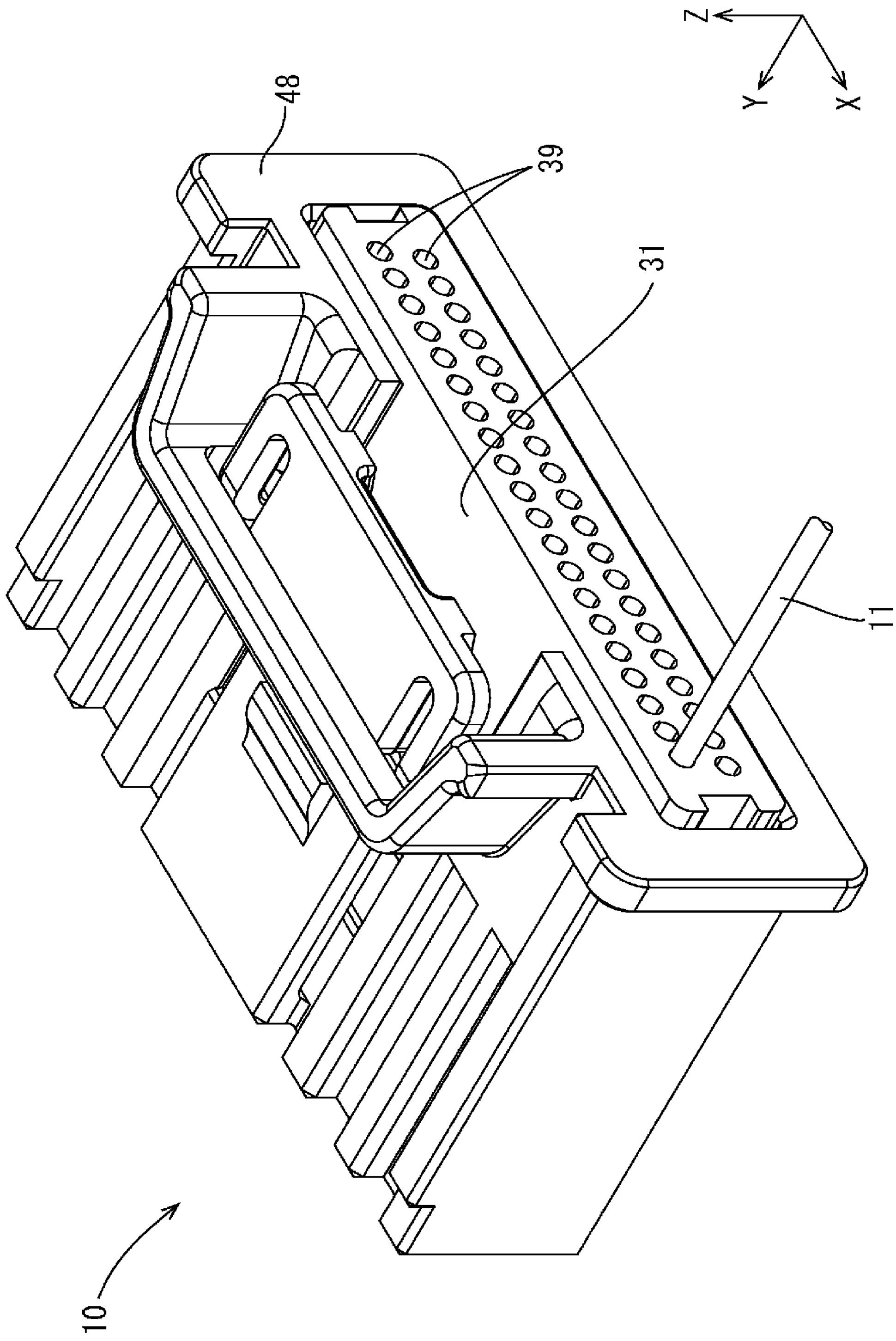
FIG. 3 is a rear perspective view of the connector according to the first embodiment.

A connector 10 according to this embodiment accommodates terminals 12 connected to ends of wires 11. As shown in FIGS. 1 to 3, the connector 10 is provided with a housing 30 including a plurality of accommodating portions 29 for accommodating the terminals 12, a rear holder 31 to be assemble with a rear end part of the housing 30 and a cover 48 for covering the housing 30 and the rear holder 31.

[Wire]

As shown in FIG. 1, the wire 11 is disposed to extend in a front-rear direction. The wire 11 is such that the outer peripheral surface of a core wire 13 is surrounded with an insulation coating 14 made of insulating synthetic resin. The core wire 13 is made of electrically conductive metal and constituted by a stranded wire formed by stranding a plurality of metal wires or one metal wire. An end part of the insulation coating 14 is stripped to expose the core wire 13.

[Terminal]

Figure 4:
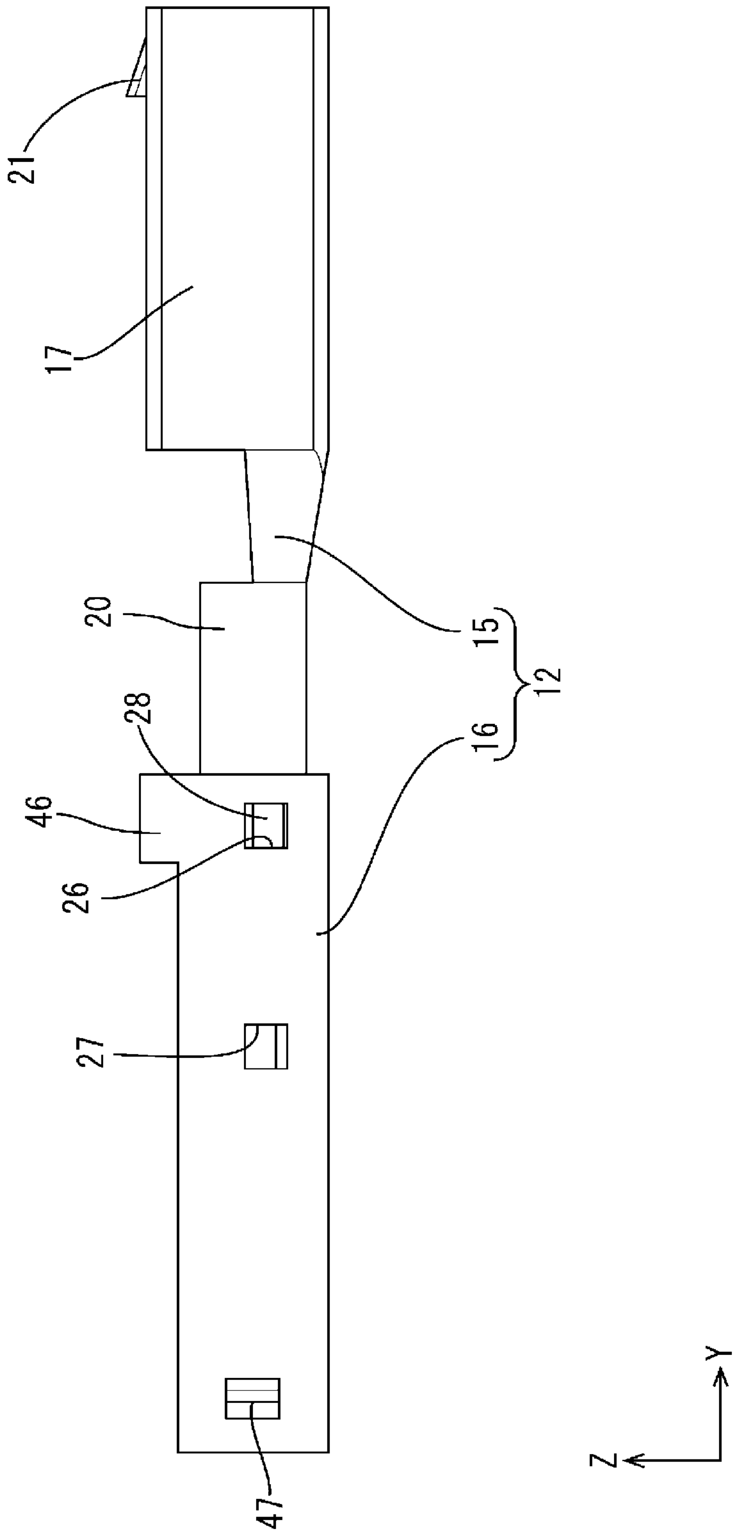
FIG. 4 is a side view of a terminal according to the first embodiment.
Figure 5:
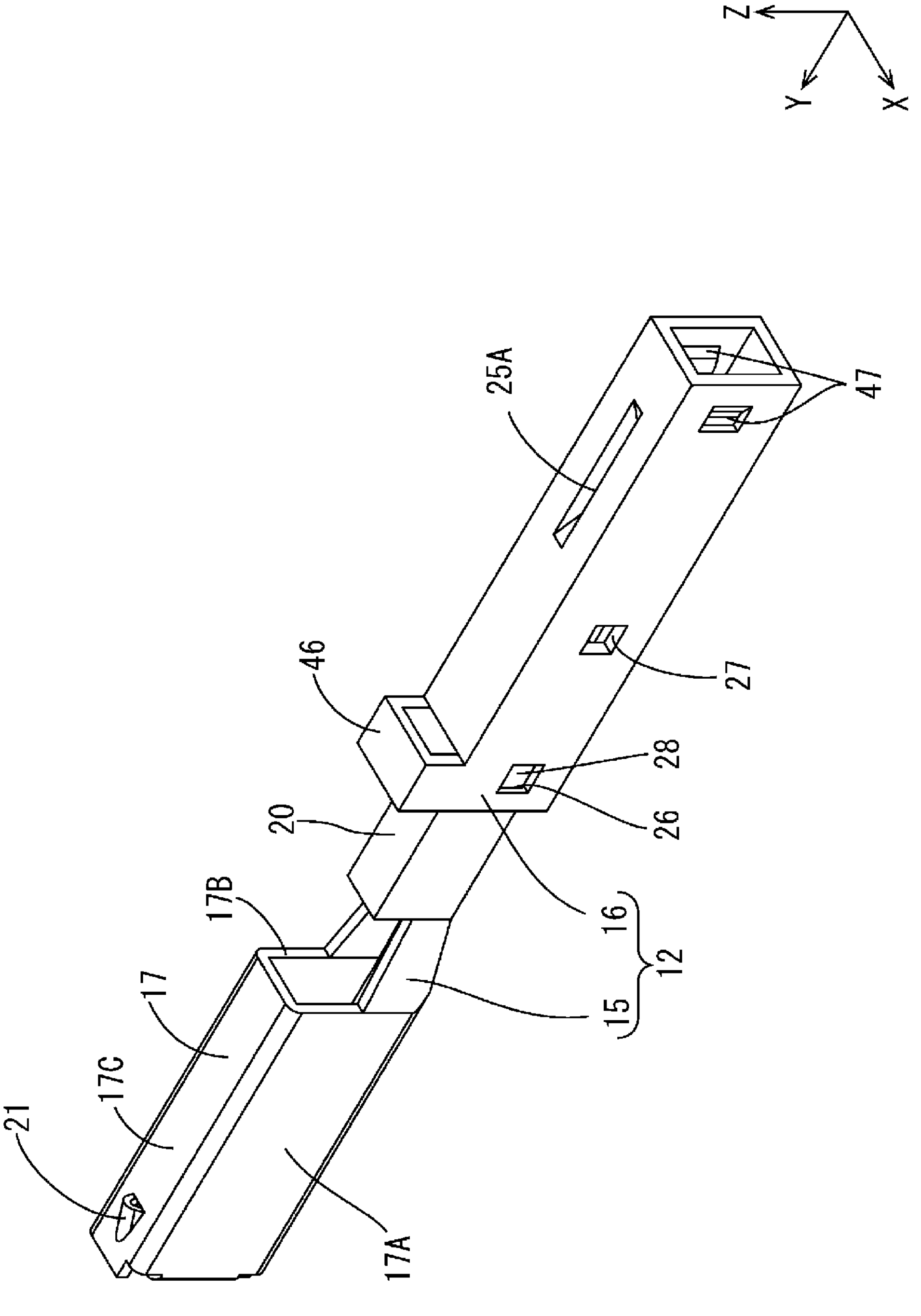
FIG. 5 is a perspective view of the terminal according to the first embodiment.

The terminal 12 is made of metal and includes, as shown in FIGS. 4 and 5, a terminal body 15 and a slide portion 16 relatively slidable with respect to the terminal body 15.

[Terminal Body]

As shown in FIG. 4, a front part of the terminal body 15 is a connecting tube portion 17 in the form of a rectangular tube extending in the front-rear direction. The connecting tube portion 17 is configured such that a plate-like mating terminal (not shown) is insertable thereinto from front.

Figure 6:
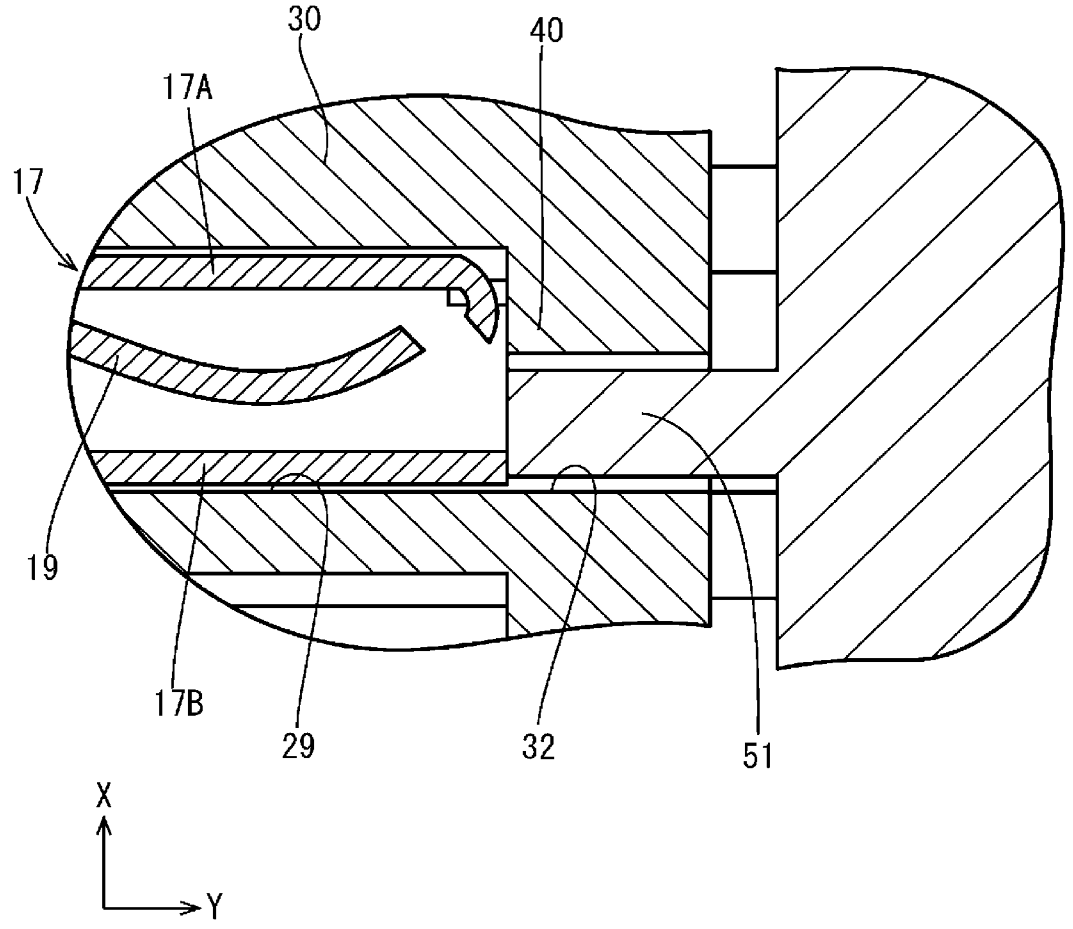
FIG. 6 is a section showing a state where a front pressing jig is brought into contact with a housing accommodating the terminal in the first embodiment.
Figure 7:
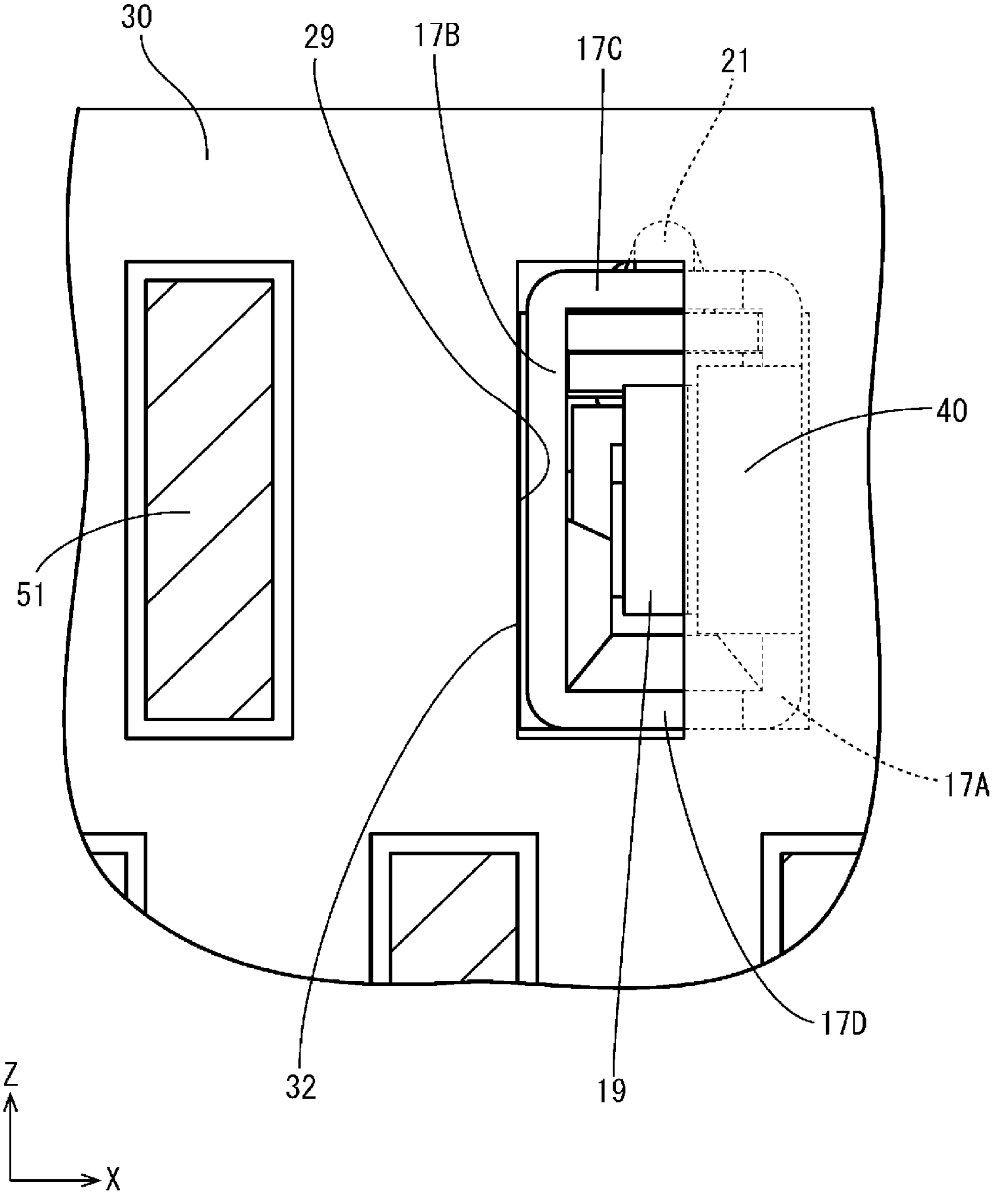
FIG. 7 is a front view showing a region where the housing accommodating the terminal and the front pressing jig are inserted in the first embodiment.

As shown in FIG. 6, a contact piece 19 extending forward from a rear part of the connecting tube portion 17 is disposed inside the connecting tube portion 17. The mating terminal inserted into the connecting tube portion 17 contacts the contact piece 19. A wall portion of the connecting tube portion 17 provided with the contact piece 19 serves as a first wall portion 17A. A wall portion facing the first wall portion 17A serves as a second wall portion 17B. As shown in FIG. 7, a pair of wall portions connecting both edge parts of the first wall portion 17A and both edge parts of the second wall portion 17B serve as a third wall portion 17C and a fourth wall portion 17D. As shown in FIG. 5, a chevron-shaped locking lance 21 projecting upward is formed in a front part of the third wall portion 17C.

Figure 8:
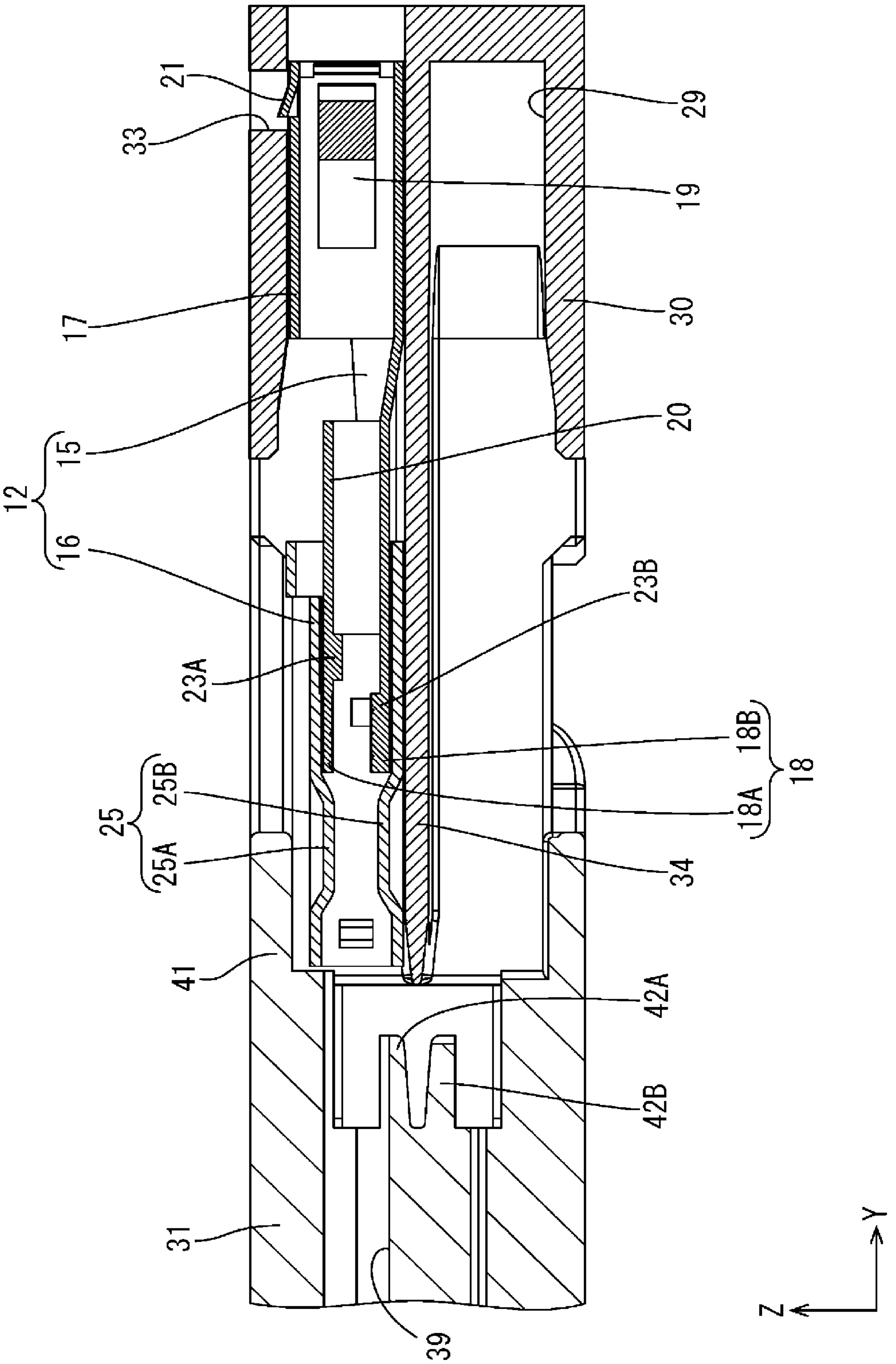
FIG. 8 is a section showing a state where the terminal and a rear holder are mounted in the housing and held at a partial locking position in the first embodiment.

As shown in FIG. 5, a base portion 20 in the form of a rectangular tube is provided behind the connecting tube portion 17. As shown in FIG. 8, sandwiching portions 18 for sandwiching the core wire 13 are provided in a rear end part of the base portion 20. One of the sandwiching portions 18 extending rearward from a rear end part of the upper wall of the base portion 20 serves as an upper sandwiching portion 18A, and the other of the sandwiching portions 18 extending rearward from a rear end part of the lower wall of the base portion 20 serves as a lower sandwiching portion 18B. The upper and lower sandwiching portions 18A, 18B have a shape elongated in the front-rear direction and have substantially equal lengths in the front-rear direction. The upper and lower sandwiching portions 18A, 18B are formed to be resiliently deformable in the vertical direction with the rear end part of the base portion 20 as a fulcrum.

As shown in FIG. 8, an upper holding protrusion 23A projecting downward is provided at a position forward of a rear end part on the lower surface of the upper sandwiching portion 18A. A lower holding protrusion 23B projecting upward is provided in a rear end part on the upper surface of the upper sandwiching portion 18B. The upper and lower holding protrusions 23A, 23B are provided at positions shifted in the front-rear direction.

Figure 10:
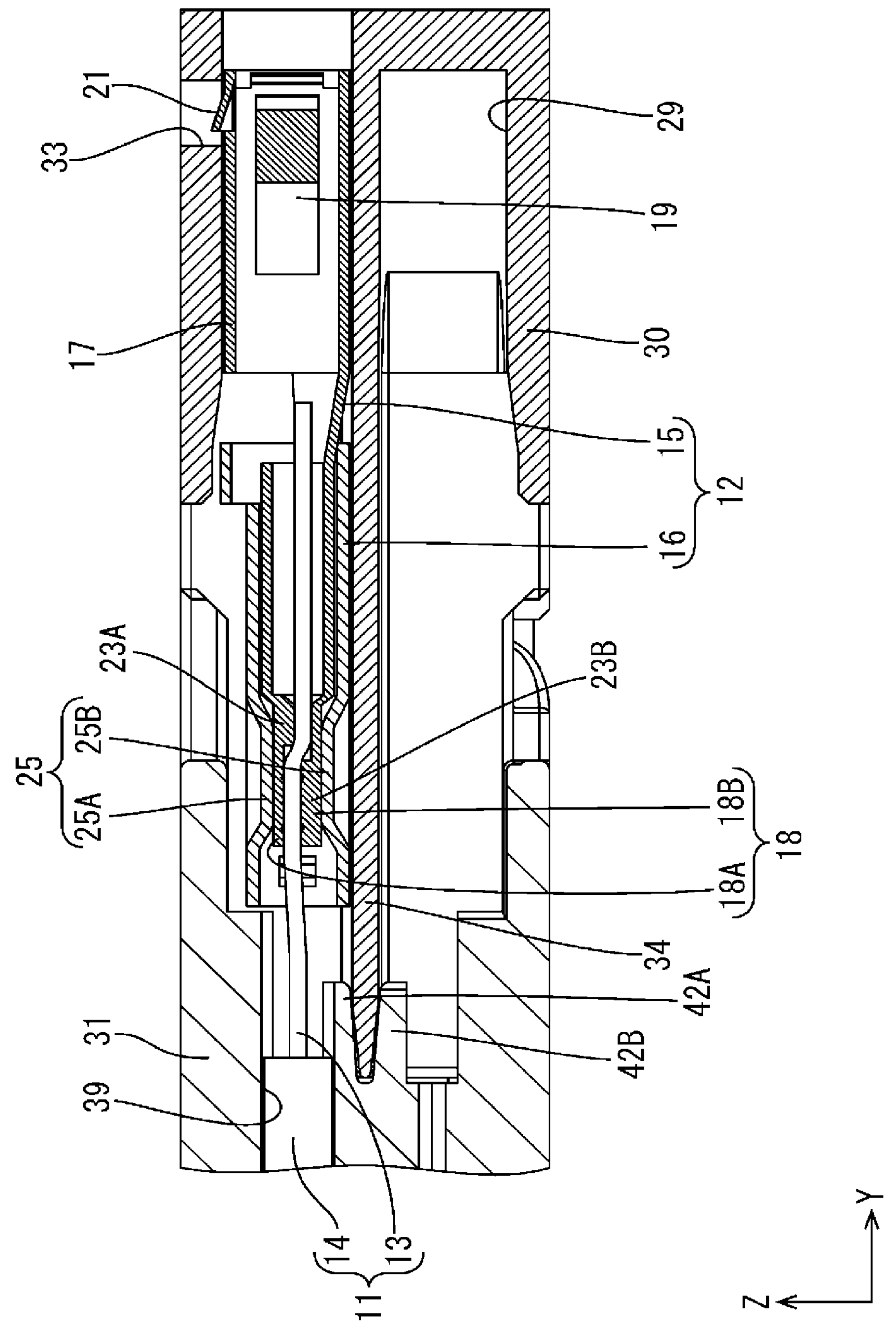
FIG. 10 is a section showing a state where the rear holder is moved to a full locking position with respect to the housing in the first embodiment.

As shown in FIG. 10, the lower surface of the upper sandwiching portion 18A and the upper surface of the lower sandwiching portion 18B can sandwich the core wire 13 and electrically connect the wire 11 and the terminal body 15.

As shown in FIG. 4, a locking projection 28 projecting outward is formed on a side wall of the terminal body 15.

[Slide Portion]

An inner cross-sectional shape of the slide portion 16 is the same as or somewhat larger than an outer cross-sectional shape of a region of the terminal body 15 where the upper and lower sandwiching portions 18A, 18B are provided. In this way, the slide portion 16 is externally fittable to the region of the terminal body 15 where the upper and lower sandwiching portions 18A, 18B are provided.

As shown in FIG. 8, the slide portion 16 is provided with pressurizing portions 25. The pressurizing portions 25 include an upper pressurizing portion 25A projecting downward on the lower surface of the upper wall of the slide portion 16 and a lower pressurizing portion 25A projecting upward on the upper surface of the lower wall of the slide portion 16.

As shown in FIGS. 4 and 5, a partial lock receiving portion 26 is open at a position near a front end part in the front-rear direction in a side wall of the slide portion 16. Further, a full lock receiving portion 27 is open at a position rearward of the partial lock receiving portion 26 in the side wall of the slide portion 16. The partial and full lock receiving portions 26, 27 are resiliently lockable to the locking projection 28 provided on the side wall of the terminal body 15.

A state where the locking projection 28 of the terminal body 15 and the partial lock receiving portion 26 of the slide portion 16 are locked is a state where the slide portion 16 is held at a partial locking position (an example of a first position) with respect to the terminal body 15. In this state, as shown in FIG. 8, the upper and lower pressurizing portions 25A, 25B of the slide portion 16 are disposed rearward of the rear end edges of the upper and lower sandwiching portions 18A, 18B of the terminal body 15. Further, in this state, an interval between the upper and lower sandwiching portions 18A, 18B is set larger than a diameter of the core wire 13.

With the locking projection 28 of the terminal body 15 and the full lock receiving portion 27 of the slide portion 16 locked, the slide portion 16 is locked at a full locking position (an example of a second position) with respect to the terminal body 15. In this state, as shown in FIG. 10, the upper pressurizing portion 25A of the slide portion 16 is in contact with the upper surface of the upper sandwiching portion 18A of the terminal body 15 from above. Further, the lower pressurizing portion 25B of the slide portion 16 is in contact with the lower surface of the lower sandwiching portion 18B of the terminal body 15 from below.

With the slide portion 16 held at the full locking position with respect to the terminal body 15, the upper sandwiching portion 18A is resiliently deformed downward by being pressed from above by the upper pressurizing portion 25A. Further, the lower sandwiching portion 18B is resiliently deformed upward by being pressed from below by the lower pressurizing portion 25B. In this way, the core wire 13 is disposed to extend in the front-rear direction in a space between the upper and lower sandwiching portions 18A, 18B and, with the slide portion 16 held at the full locking position with respect to the terminal body 15, the core wire 13 is sandwiched in the vertical direction by the resiliently deformed upper and lower sandwiching portions 18A, 18B.

With the slide portion 16 held at the full locking position with respect to the terminal body 15, the upper holding protrusion 23A of the upper sandwiching portion 18A presses the core wire 13 from above and the lower holding protrusion 23B of the lower sandwiching portion 18B presses the core wire 13 from below. In this way, the core wire 13 is pressed from above by the upper holding protrusion 23A and pressed from below by the lower holding protrusion 23B disposed at a position shifted from the upper holding protrusion 23A in the front-rear direction, thereby being held in a state bent in the vertical direction.

Figure 9:
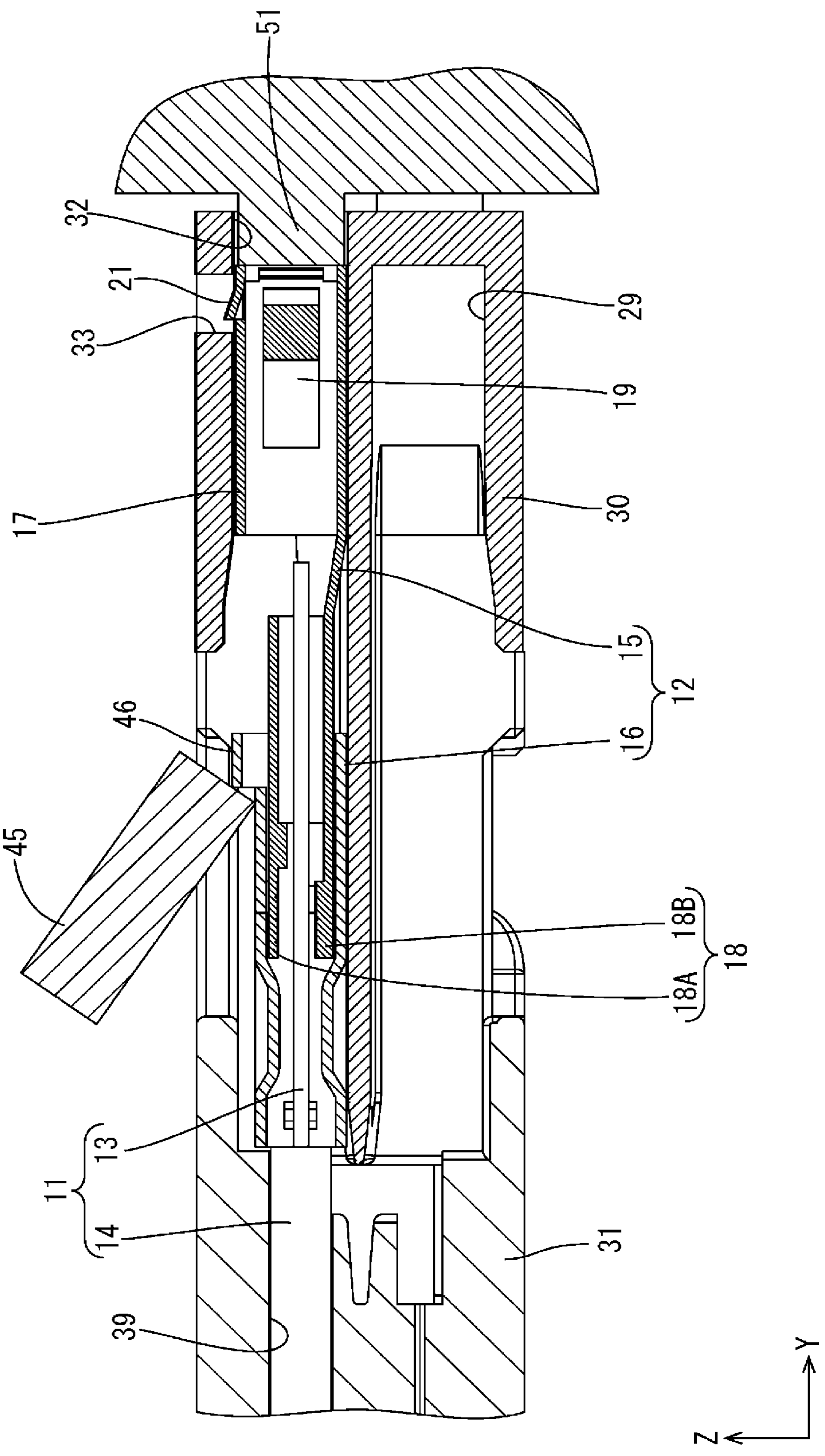
FIG. 9 is a section showing a step of moving a slide portion from a partial locking position to a full locking position with respect to a terminal body in the first embodiment.

As shown in FIGS. 4 and 5, a press receiving portion 46 projecting upward from the upper wall is provided in a front end part of the slide portion 16. As shown in FIG. 9, a pressing jig 45 comes into contact with the press receiving portion 46 from behind to push the slide portion 16 forward, whereby the slide portion 16 becomes movable forward.

As shown in FIGS. 4 and 5, a pair of core wire guiding portions 47 projecting inwardly of the slide portion 16 are provided at positions near a rear end part of the slide portion 16 on both left and right side walls. The core wire guiding portion 47 is formed to become narrower from the rear to the front. The core wire 13 slides in contact with the inner surfaces of the core wire guiding portions 47, thereby being guided into the slide portion 16.

[Housing]

Figure 11:
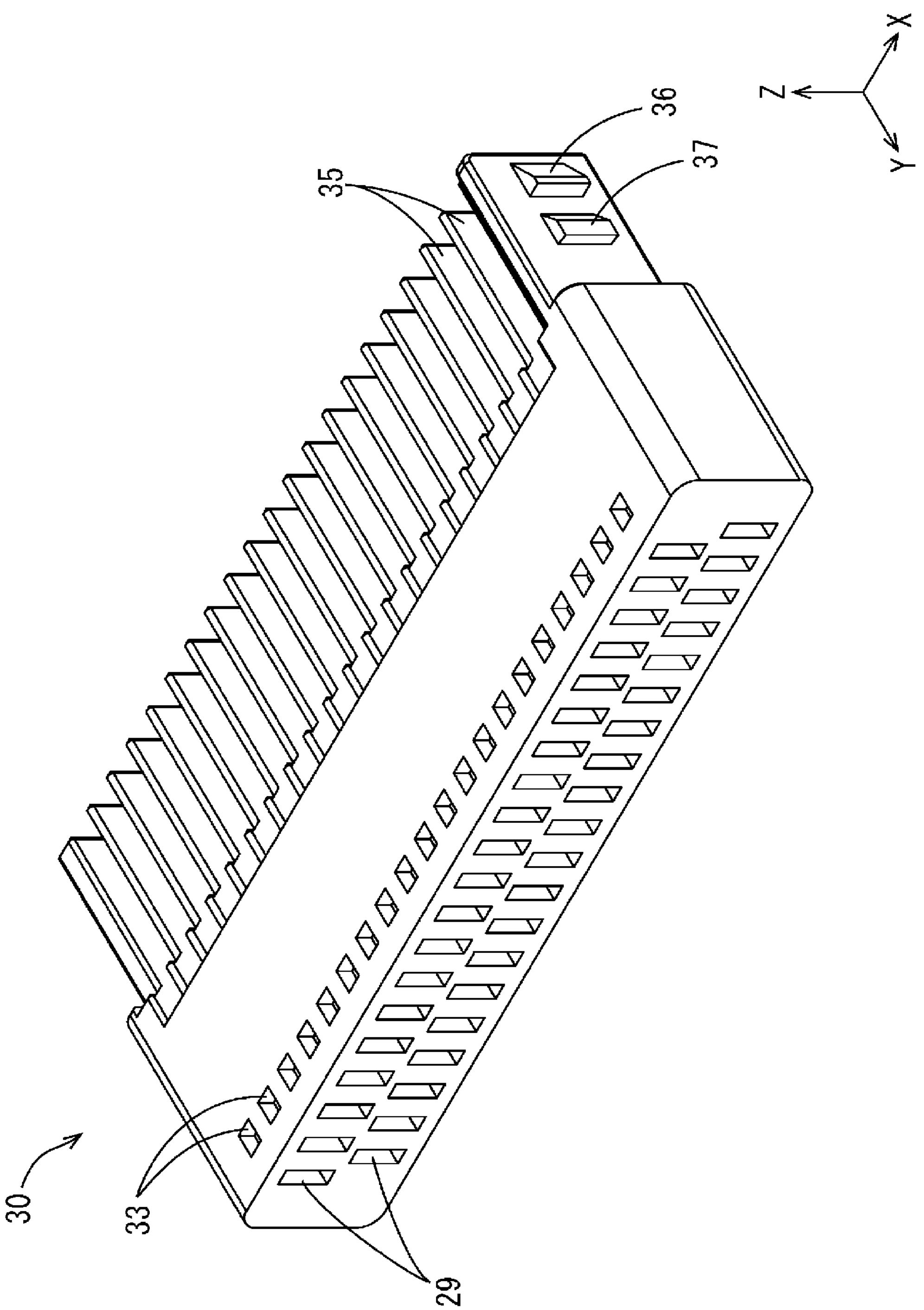
FIG. 11 is a perspective view of the housing according to the first embodiment.

As shown in FIG. 11, the housing 30 has a flat rectangular parallelepiped shape short in the vertical direction and extending in the lateral direction. The housing 30 is formed by injection-molding an insulating synthetic resin. The housing 30 is formed with a plurality of accommodating portions 29 extending in the front-rear direction for accommodating the terminals 12, aligned at intervals in the lateral direction and arranged in two upper and lower stages. The respective accommodating portions 29 formed in the upper stage and those formed in the lower stage are disposed at positions shifted in the lateral direction. Note that the number of the accommodating portions 29 is arbitrary and the number of stages in the vertical direction is also arbitrary.

The front end of the accommodating portion 29 is open forward and the mating terminal is insertable thereinto. The rear end of the accommodating portion 29 is open rearward and the terminal 12 can be accommodated thereinto from behind.

As shown in FIG. 8, the housing 30 is provided with locking walls 33 to correspond to the positions of the locking lances 21 of the terminals 12 with the terminals 12 accommodated in the accommodating portions 29. The locking lance 21 is locked by the locking wall 33 to prevent the terminal 12 from coming outward rearward.

As shown in FIG. 6, front stop portions 40 are formed to cover the first wall portions 17A of the terminals 12 from front in a front end part of the housing 30. The front stop portion 40 comes into contact with the terminal 12 to prevent the terminal 12 from coming out forward from the housing 30 when the terminal 12 is inserted into the accommodating portion 29.

As shown in FIGS. 6 and 7, openings 32 are provided in parts of a front end part of the housing 30 except the front stop portions 40. The opening 32 is configured to receive a front pressing jig 51 shown by oblique hatching in FIG. 7. An internal shape of the opening 32 is the same as or somewhat larger than an external shape of the front pressing jig 51. The opening 32 exposes a part of a front end part of the third wall portion 17C, a part of a front end part of the fourth wall portion 17D and a front end part of the second wall portion 17B to front. In this way, as shown in FIG. 6, the front pressing jig 51 can be brought into contact with a front end part of the connecting tube portion 17 from front.

As shown in FIG. 9, by inserting the front pressing jig 51 into the opening 32 from front and bringing the front pressing jig 51 into contact with the connecting tube portion 17, the deformation of the terminal 12 and the housing 30 can be suppressed when the press receiving portion 46 of the slide portion 16 is pressed from behind by the pressing jig 45 to move the slide portion 16 from the partial locking position to the full locking position.

As shown in FIG. 8, the housing 30 includes a separation wall 34 partitioning between the accommodating portions 29 formed in the upper stage and those formed in the lower stage. The separation wall 34 extends rearward from rear end parts of the accommodating portions 29. As shown in FIG. 11, partition walls 35 extending in the front-rear direction and projecting upward and downward are respectively provided on the upper and lower surfaces of the separation wall 34. The terminals 12 accommodated into the respective accommodating portions 29 are electrically insulated from the terminals 12 adjacent in the lateral direction by these partition walls 35.

As shown in FIG. 11, partial locking portions 36 projecting outward are provided at positions near rear end parts of both left and right side walls of the housing 30, and full locking portions 37 are provided to project outward at positions forward of these partial locking portions 36.

[Rear Holder]

Figure 12:
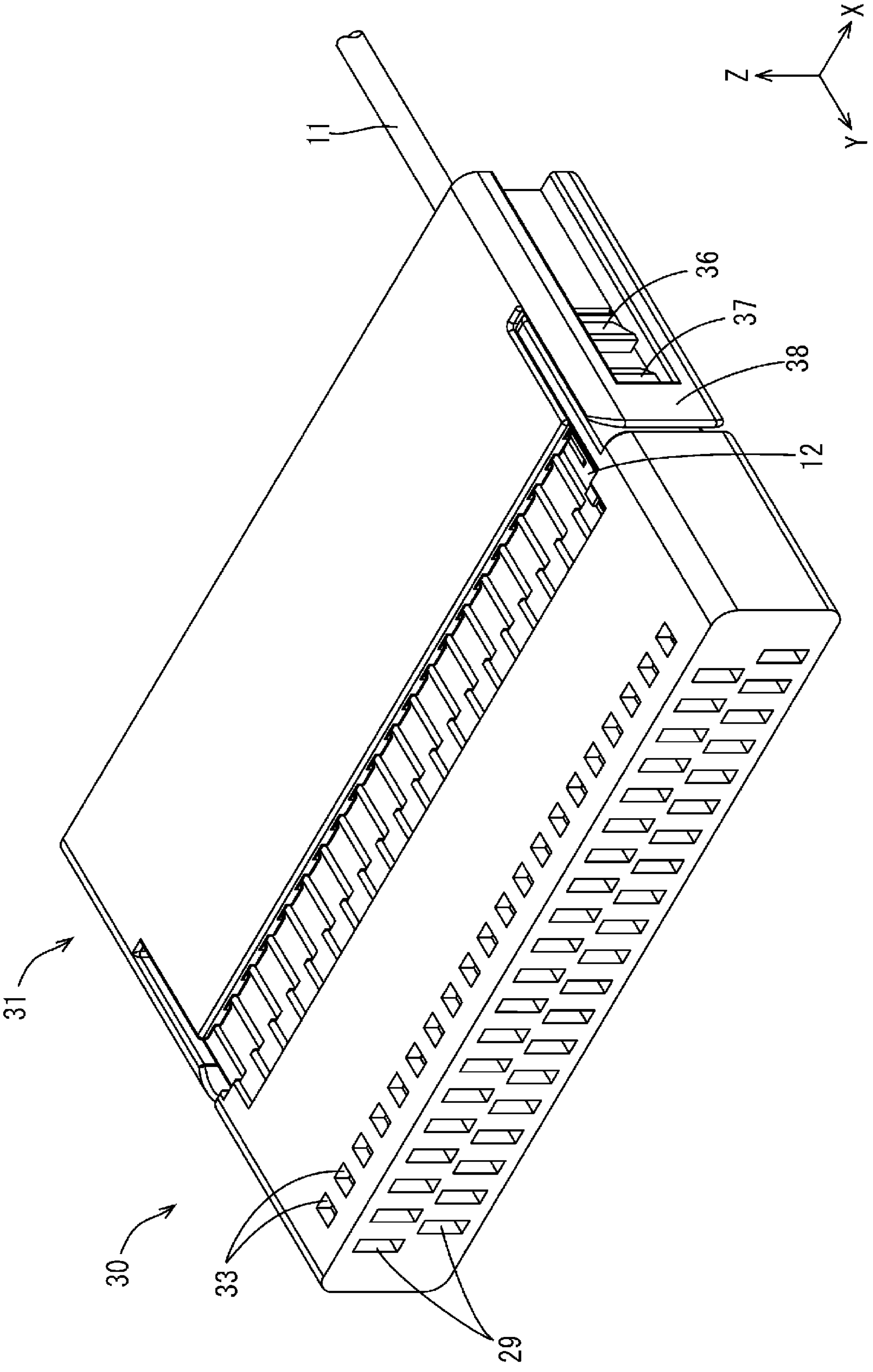
FIG. 12 is a perspective view showing a state where the terminal and the rear holder are mounted in the housing and held at the full locking position in the first embodiment.

As shown in FIG. 12, the rear holder 31 is in the form of a box open forward. The rear holder 31 is formed by injection-molding an insulating synthetic resin. The rear holder 31 is externally fit to a rear half of the housing 30. Lock receiving portions 38 resiliently lockable to the partial locking portions 36 and the full locking portions 37 of the housing 30 are provided at positions near front end parts of both left and right side walls of the rear holder 31. The lock receiving portion 38 is substantially gate-shaped.

The rear holder 31 is held at a partial locking position with respect to the housing 30 by locking the partial locking portions 36 of the housing 30 and the lock receiving portions 38 of the rear holder 31. Further, the rear holder 31 is held at a full locking position with respect to the housing 30 by locking the full locking portions 37 of the housing 30 and the lock receiving portions 38 of the rear holder 31.

As shown in FIG. 3, the rear holder 31 is provided with a plurality of insertion holes 39 aligned in the lateral direction and arranged side by side in two upper and lower stages, and the wires 11 are inserted through the insertion holes 39. The insertion holes 39 are provided at positions corresponding to the accommodating portions 29 of the housing 30. An inner diameter of the insertion hole 39 is set equal to or somewhat larger than an outer diameter of the insulation coating 14 of the wire 11.

As shown in FIG. 8, the rear holder 31 includes a receptacle 41 into which the housing 30 is fit and which is open forward. A pair of projecting walls 42A, 42B projecting forward into the receptacle 41 and arranged at an interval in the vertical direction are provided near a vertical center in a rear end part of the receptacle 41. The vertical interval between the pair of projecting walls 42A, 42B is set equal to or somewhat larger than a vertical thickness of the separation wall 34 of the housing 30.

As shown in FIG. 8, with the rear holder 31 held at the full locking position with respect to the housing 30, the pair of projecting walls 42A, 42B of the rear holder 31 are located rearward of the rear end edge of the separation wall 34 of the housing 30. As shown in FIG. 10, with the rear holder 31 held at the full locking position with respect to the housing 30, the separation wall 34 of the housing 30 is fit in between the pair of projecting walls 42A and 42B of the rear holder 31. In this way, a vertical position shift of the rear holder 31 with respect to the housing 30 is suppressed.

[Cover]

As shown in FIG. 3, the cover 48 is in the form of a box open rearward. The cover 48 is formed by injection-molding an insulating synthetic resin. As shown in FIG. 1, the housing 30 and the rear holder 31 held at the full locking position with respect to the housing 30 can be accommodated into the cover 48 from behind. A plurality of ribs (not shown) projecting inwardly of the cover 48 toward the front are provided on the inner wall of the cover 48. In this way, a state where the housing 30 and the rear holder 31 are accommodated at proper positions can be held.

Figure 13:
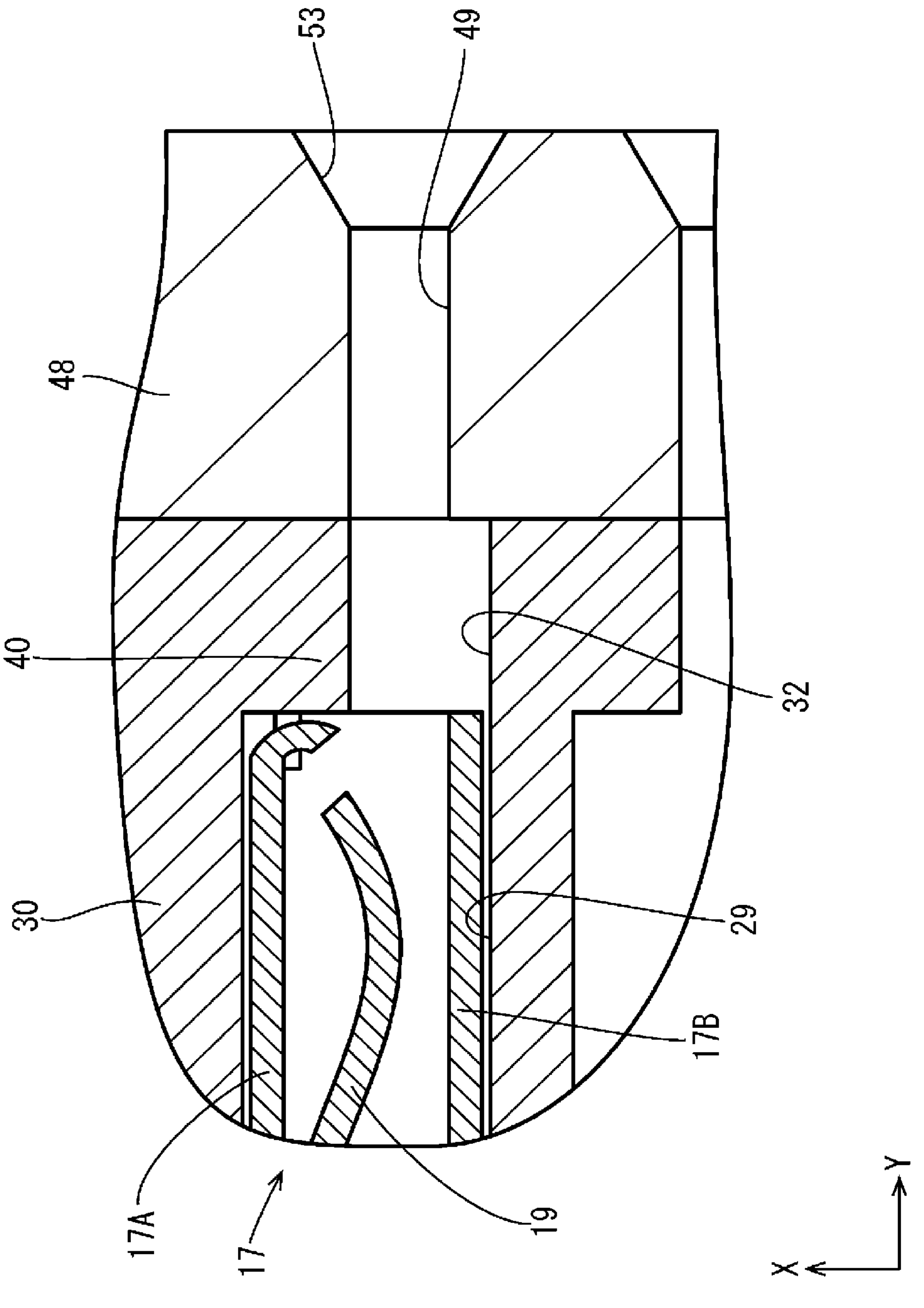
FIG. 13 is a section showing a state where a cover is covering an opening of the housing in the first embodiment.

As shown in FIG. 2, the cover 48 is provided with insertion holes 49 aligned in the lateral direction and arranged side by side in two upper and lower stages, and the mating terminals are inserted through the insertion holes 49. The insertion holes 49 are provided at positions corresponding to the accommodating portions 29 of the housing 30. As shown in FIG. 13, the cover 48 covers and closes the openings 32 provided in the housing 30 from front. Further, a guiding portion 53 is provided on the inner wall of the insertion hole 49. The guiding portion 53 is formed to become narrower from the front toward the rear, and the mating terminal is easily inserted to a proper position of the terminal body 15.

Example of Assembly Process of Connector 10

Next, an example of an assembly process of the connector 10 according to this embodiment is described. The assembly process of the connector 10 is not limited to the one described below.

By a known method, the terminal bodies 15 and the slide portions 16 are formed. The slide portion 16 is assembled with the terminal body 15 from behind. The front end edge of the slide portion 16 comes into contact with the locking projection 28 of the terminal body 15 from behind, whereby the side wall of the slide portion 16 is expanded and deformed. If the slide portion 16 is pushed further forward, the side wall of the slide portion 16 resiliently returns and the partial lock receiving portion 26 of the slide portion 16 is locked to the locking projection 28 of the terminal body 15. In this way, the slide portion 16 is held at the partial locking position with respect to the terminal body 15. In this way, the terminal 12 is obtained (see FIG. 5).

By injection-molding the synthetic resin, the housing 30, the rear holder 31 and the cover 48 are formed.

As shown in FIG. 8, the terminals 12 are inserted into the accommodating portions 29 of the housing 30 from behind and the rear holder 31 is assembled with the rear end part of the housing 30 from behind. Then, the lock receiving portions 38 of the rear holder 31 ride on the partial locking portions 36 of the housing 30 while being resiliently deformed. If the rear holder 31 is pushed further forward, the lock receiving portions 38 resiliently return and the lock receiving portions 38 are resiliently locked to the partial locking portions 36 of the housing 30. In this way, the rear holder 31 is held at the partial locking position with respect to the housing 30.

The insulation coating 14 is stripped in the end part of the wire 11 to expose the core wire 13 of a predetermined length. A front end part of the core wire 13 is inserted from behind into the insertion hole 39 provided in the rear end part of the rear holder 31.

If the wire 11 is pushed further forward, the front end part of the core wire 13 projects forward from the insertion hole 39 of the rear holder 31 and is introduced into the slide portion 16 from the rear end part of the slide portion 16. The core wire 13 comes into contact with the core wire guiding portions 47 of the slide portion 16, thereby being guided into the slide portion 16. If the wire 11 is pusher further forward, the front end part of the core wire 13 enters the inside of the terminal body 15 and passes through the space between the upper and lower sandwiching portions 18A, 18B as shown in FIG. 9. In this state, the insulation coating 14 of the wire 11 is located in the insertion hole 39 of the rear holder 31 (see FIG. 9).

Subsequently, as shown in FIG. 9, the front pressing jig 51 is inserted into the opening 32 from front and brought into contact with the front end part of the connecting tube portion 17. If the pressing jig 45 is pressed against the press receiving portion 46 from behind in this state, the slide portion 16 moves relatively forward with respect to the terminal body 15. At this time, the locking of the locking projection 28 of the terminal body 15 and the partial lock receiving portion 26 of the slide portion 16 is released and the side wall of the slide portion 16 rides on the locking projection 28 to be expanded and deformed.

If the press receiving portion 46 is pressed further forward by the pressing jig 45, the side wall of the slide portion 16 resiliently returns and the locking projection 28 of the terminal body 15 and the full lock receiving portion 27 of the slide portion 16 are resiliently locked. In this way, the slide portion 16 is held at the full locking position with respect to the terminal body 15.

When the slide portion 16 moves to the full locking position with respect to the terminal body 15, the upper pressurizing portion 25A of the slide portion 16 comes into contact with the upper sandwiching portion 18A of the terminal body 15 from above to press the upper sandwiching portion 18A downward. Further, the lower pressurizing portion 25B of the slide portion 16 comes into contact with the lower sandwiching portion 18B of the terminal body 15 from below to press the lower sandwiching portion 18B upward. In this way, the core wire 13 is vertically sandwiched by the upper and lower sandwiching portions 18A, 18B and the wire 11 and the terminal 12 are electrically connected (see FIG. 10).

With the core wire 13 vertically sandwiched by the upper and lower sandwiching portions 18A, 18B, the core wire 13 is held in a state extending in the front-rear direction and bent in the vertical direction by being sandwiched by the upper holding protrusion 23A of the upper sandwiching portion 18A and the lower holding protrusion 23B of the lower sandwiching portion 18B. In this way, the terminal 12 can firmly hold the core wire 13 (see FIG. 10).

Subsequently, if the rear holder 31 is pressed forward, the lock receiving portions 38 of the rear holder 31 ride on the full locking portions 37 of the housing 30 to be resiliently deformed. If the rear holder 31 is pressed further forward, the full locking portions 37 and the lock receiving portions 38 are locked. Further, the separation wall 34 of the housing 30 is fit into between the pair of projecting walls 42A and 42B of the rear holder 31. In this way, the rear holder 31 is held at the full locking position with respect to the housing 30 (see FIG. 10).

Finally, by accommodating the above housing 30 and rear holder 31 into the cover 48, the assembly of the connector 10 is completed (see FIG. 1).

Functions and Effects of Present Embodiment

According to this embodiment, the following functions and effects are achieved.

The connector 10 according to this embodiment is provided with the terminals 12 to be connected to the core wires 13 located on the end parts of the wires 11 including the core wires 13 and the housing 30 including the accommodating portions 29 for accommodating the terminals 12, the terminal 12 includes the terminal body 15 having the sandwiching portions 18 and the slide portion 16 for sandwiching the core wire 13 by the sandwiching portions 18 by being pressed and slid from behind with respect to the terminal body 15, the housing 30 includes the openings 32, and the openings 32 partially expose the front end parts of the terminal bodies 15.

According to the above configuration, by inserting the front pressing jig 51 into the opening 32 from front and bringing the front pressing jig 51 into contact with the terminal body 15, it is possible to suppress the deformation of the housing 30 and the terminal 12 when the slide portion 16 is pressed and slid from behind and sandwich and connect the core wire 13 by a slide structure.

In this embodiment, the terminal body 15 includes the connecting tube portion 17, the connecting tube portion 17 has the first wall portion 17A provided with the contact piece 19 configured to contact the mating terminal inserted into the connecting tube portion 17, and the housing 30 includes the front stop portion 40 for covering the front end part of the first wall portion 17A.

According to the above configuration, the contact piece 19 can be protected when the front pressing jig 51 is inserted into the opening 32 and when the mating terminal is inserted into the connecting tube portion 17.

In this embodiment, the connecting tube portion 17 has the second wall portion 17B facing the first wall portion 17A, and the third and fourth wall portions 17C, 17D connecting the both side edge parts of the first wall portion 17A and those of the second wall portion 17B, and the opening 32 exposes a part of the front end part of the third wall portion 17C, a part of the front end part of the fourth wall portion 17D and the front end part of the second wall portion 17B.

According to the above configuration, the front pressing jig 51 can be brought into contact with a part of the front end part of the third wall portion 17C, a part of the front end part of the fourth wall portion 17D and the front end part of the second wall portion 17B.

In this embodiment, the housing 30 is covered by the cover 48, and the cover 48 covers the openings 32 from front and includes the guiding portions 53 for guiding the insertion of the mating terminals into the terminal bodies 15.

According to the above configuration, the insertion of the mating terminals into the terminal bodies 15 is facilitated.

In this embodiment, the slide portion 16 is movable in the front-rear direction between the partial locking position and the full locking position forward of the partial locking position while being externally fit to the region where the sandwiching portions 18 are provided, the slide portion 16 includes the pressurizing portions 25 for pressing the sandwiching portions 18 toward the core wire 13 at the full locking position, and the slide portion 16 is provided with the press receiving portion 46 for moving the slide portion 16 from the partial locking position to the full locking position by being pressed from behind.

According to the above configuration, the state where the core wire 13 is sandwiched by the sandwiching portions 18 can be held by fixing the slide portion 16 at the full locking position.

A manufacturing method for the connector 10 according to this embodiment is a manufacturing method for the connector 10 with the terminals 12 to be connected to the core wires 13 located on the end parts of the wires 11 including the core wires 13 and the housing 30 including the accommodating portions 29 for accommodating the terminals 12, the terminal 12 including the terminal body 15 having the sandwiching portions 18 and the slide portion 16 for sandwiching the core wire 13 by the sandwiching portions 18 by being pressed and slid from behind with respect to the terminal body 15, the housing 30 including the openings 32, the openings 32 partially exposing the front end parts of the terminal bodies 15, and the manufacturing method includes accommodating the terminals 12 into the accommodating portions 29 of the housing 30, inserting the wires 11 having the core wires 13 exposed therefrom into the terminal bodies 15, bringing the front pressing jig 51 into contact with a part of the front end part of the terminal body 15 exposed to front in the opening 32 from front, and sandwiching the core wire 13 of the wire 11 by the sandwiching portions 18 of the terminal body 15 by pressing the slide portion 16 from behind.

According to the above manufacturing method for the connector 10, it is possible to suppress the deformation of the housing 30 and the terminal bodies 15 and sandwich and connect the core wires 13 by slide structures.

Second Embodiment

Figure 14:
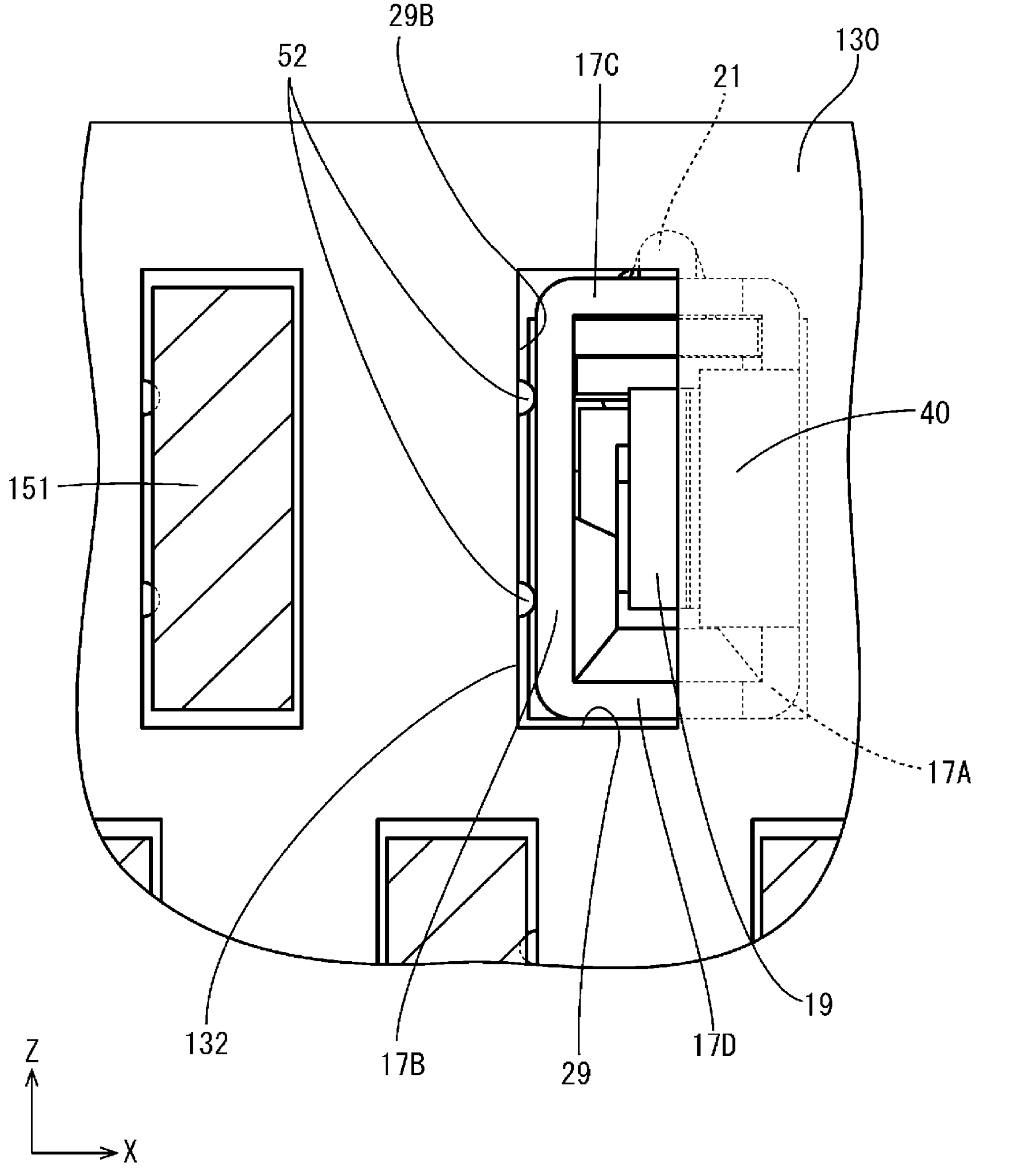
FIG. 14 is a front view showing a region where a housing accommodating a terminal and a front pressing jig are inserted in a second embodiment.

A second embodiment is described with reference to FIG. 14. In the following description, an X direction, a Y direction and a Z direction in FIG. 14 are referred to as a leftward direction, a forward direction and an upward direction. Note that the same components as those of the first embodiment are not described and are denoted by the same reference numbers as in the first embodiment.

A connector 110 according to this embodiment is provided with wires 11, terminals 12, a housing 130, a rear holder 31, and a cover 48. The housing 130 includes openings 132. The opening 132 is configured to receive a front pressing jig 151 shown by oblique hatching in FIG. 14. The opening 132 exposes a part of a front end part of a third wall portion 17C, a part of a front end part of a fourth wall portion 17D and a front end part of a second wall portion 17B.

As shown in FIG. 14, out of inner surfaces constituting an accommodating portion 29, the inner surface facing the second wall portion 17B serves as a second surface portion 29B, and two protrusions 52 extending in a front-rear direction and projecting are formed at an interval in a vertical direction on the second surface portion 29B and come into contact with the second wall portion 17B.

According to the above configuration, the front end part of the second wall portion 17B is easily contacted by the front pressing jig 151 since the front pressing jig 151 approaches a center from an outer edge of a region where the front pressing jig 151 is inserted.

Third Embodiment

Figure 15:
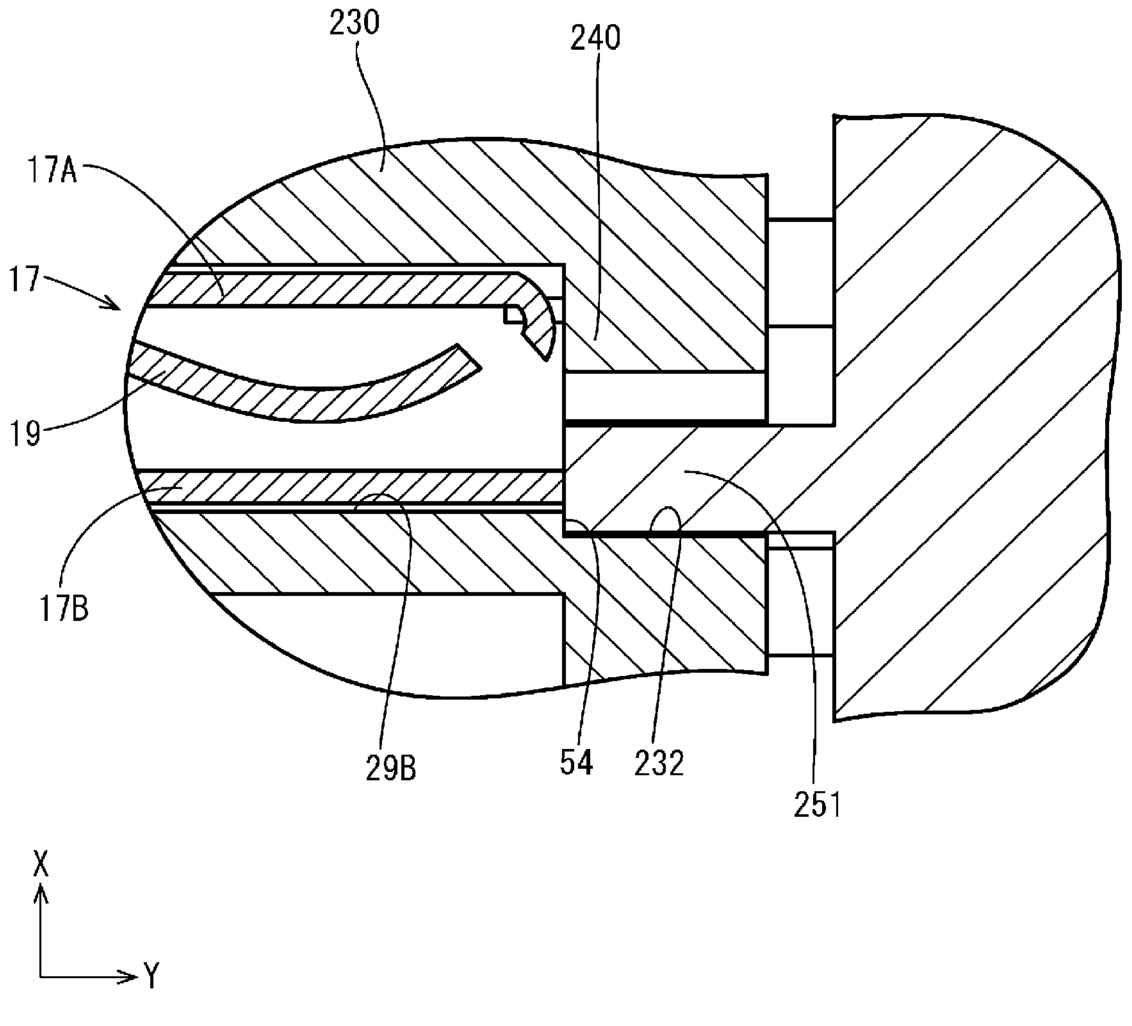
FIG. 15 is a section showing a state where a front pressing jig is held in contact with a housing accommodating a terminal in a third embodiment.
Figure 16:
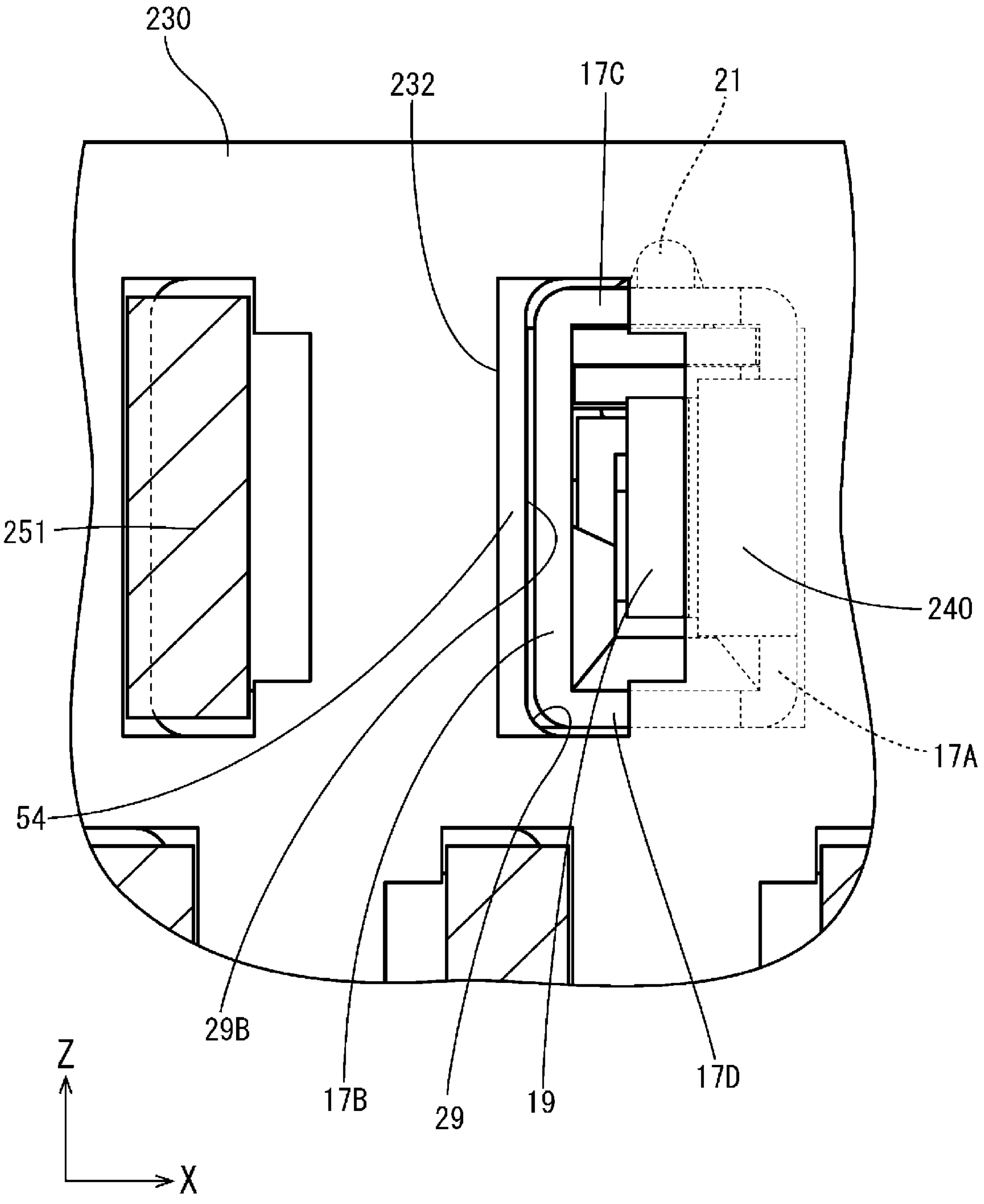
FIG. 16 is a front view showing a region where the housing accommodating the terminal and the front pressing jig are inserted in the third embodiment.

A third embodiment is described with reference to FIGS. 15 and 16. In the following description, an X direction, a Y direction and a Z direction in FIGS. 15 and 16 are referred to as a leftward direction, a forward direction and an upward direction. Note that the same components as those of the first embodiment are not described and are denoted by the same reference numbers as in the first embodiment.

A connector 210 according to this embodiment is provided with wires 11, terminals 12, a housing 230, a rear holder 31, and a cover 48. As shown in FIG. 15, the housing 230 includes front stop portions 240 and openings 232. The opening 232 is configured to receive a front pressing jig 251 shown by oblique hatching in FIG. 16. As shown in FIG. 16, the opening 232 exposes a part of a front end part of a third wall portion 17C, a part of a front end part of a fourth wall portion 17D and a front end part of a third wall portion 17B.

As shown in FIGS. 15 and 16, out of inner surfaces constituting an accommodating portion 29, the inner surface facing the second wall portion 17B serves as a second surface portion 29B, and the second surface portion 29B is connected to the opening 232 via a step surface 54.

According to the above configuration, the front end part of the second wall portion 17B is easily contacted by the front pressing jig 251 since the front pressing jig 251 approaches a center from an outer edge of a region where the front pressing jig 251 is inserted.

Fourth Embodiment

Figure 17:
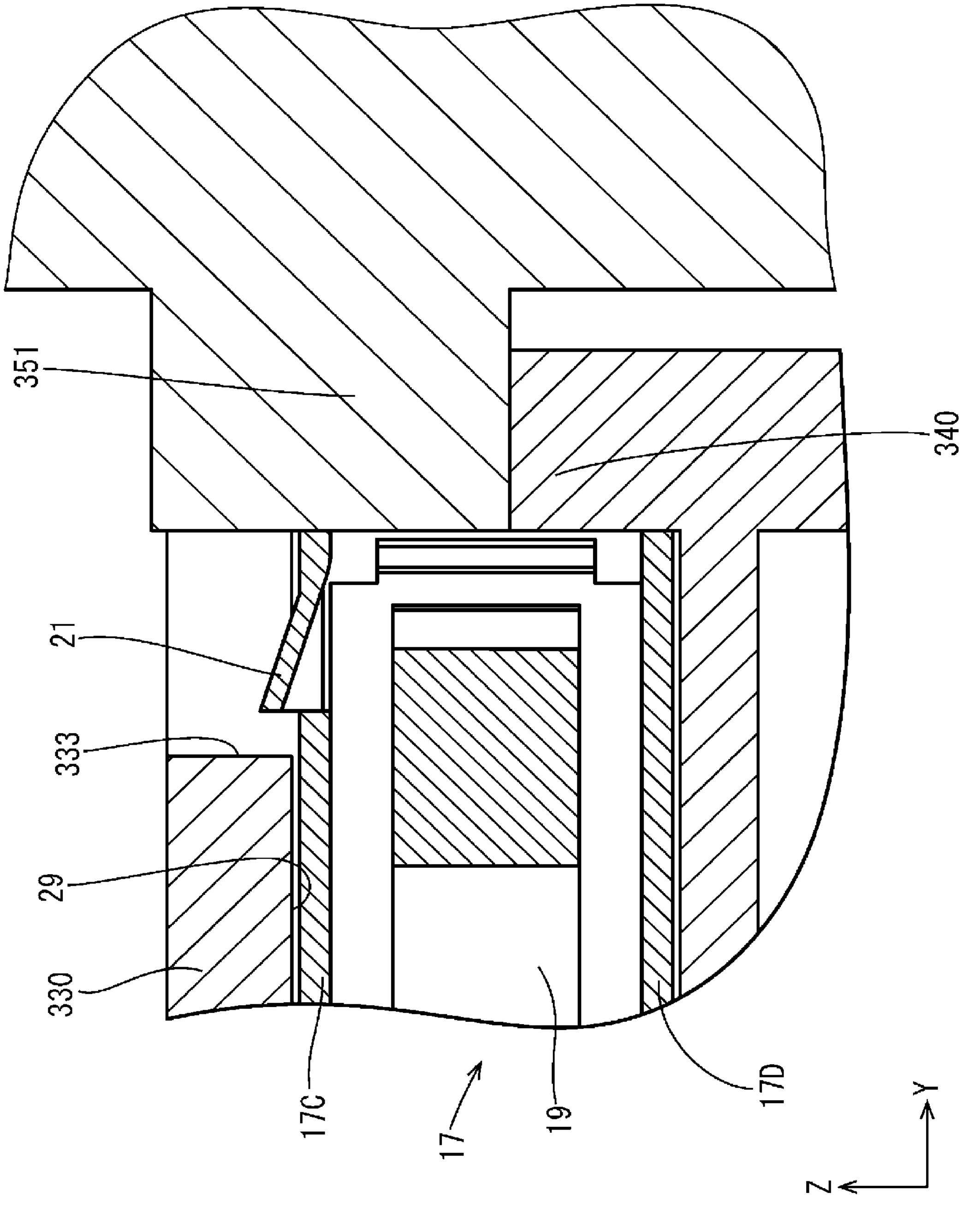
FIG. 17 is a section showing a state where a front pressing jig is held in contact with a housing accommodating a terminal in a fourth embodiment.
Figure 18:
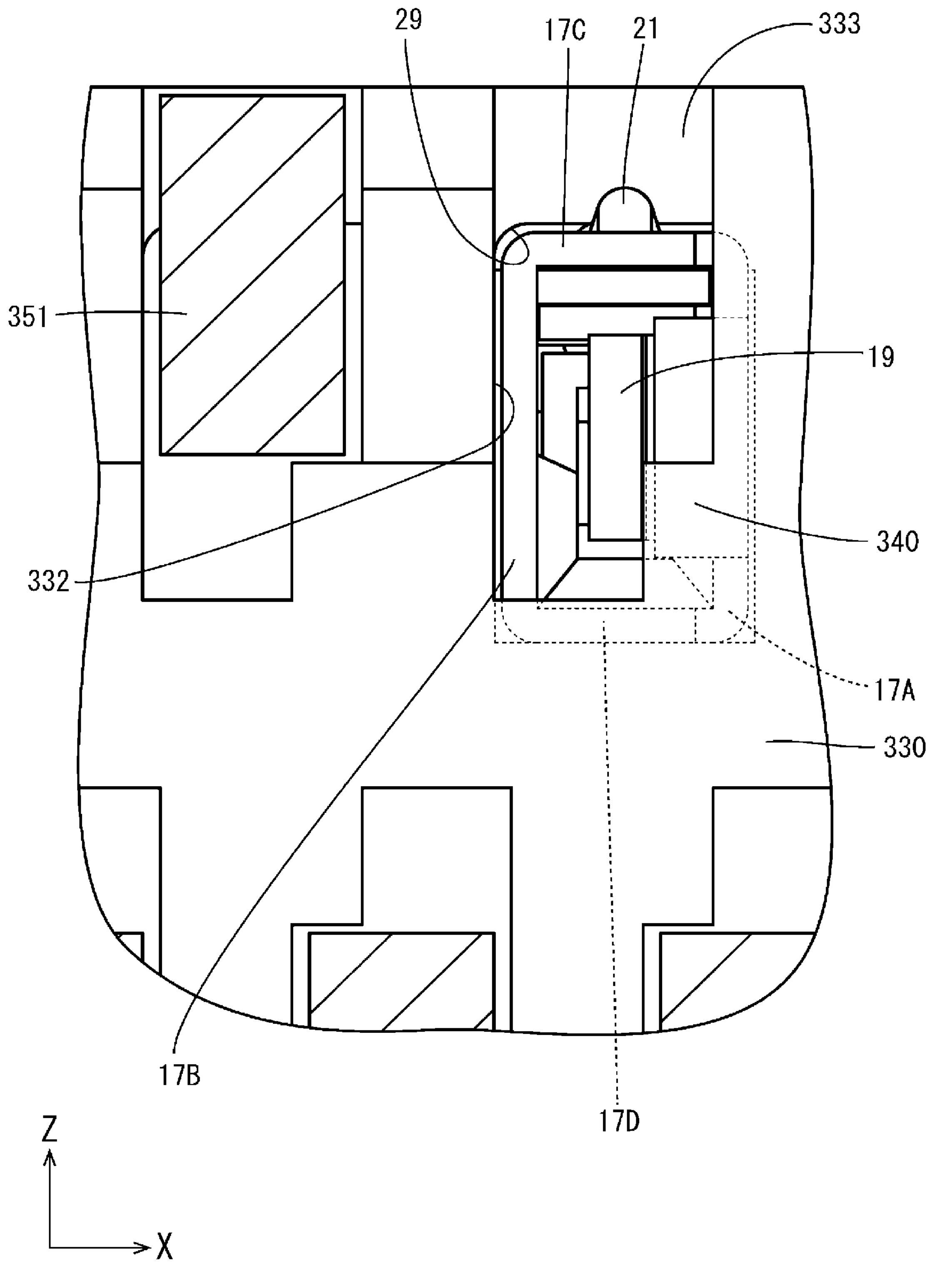
FIG. 18 is a front view showing a region where the housing accommodating the terminal and the front pressing jig are inserted in the fourth embodiment.

A fourth embodiment is described with reference to FIGS. 17 and 18. In the following description, an X direction, a Y direction and a Z direction in FIGS. 17 and 18 are referred to as a leftward direction, a forward direction and an upward direction. Note that the same components as those of the first embodiment are not described and are denoted by the same reference numbers as in the first embodiment.

A connector 310 according to this embodiment is provided with wires 11, terminals 12, a housing 330, a rear holder 31, and a cover 48. As shown in FIG. 18, the housing 330 includes front stop portions 340 and openings 332. The opening 332 is configured to receive a front pressing jig 351 shown by oblique hatching in FIG. 18.

As shown in FIG. 18, the front stop portion 340 of the housing 330 covers a front end part of a first wall portion 17A and a front end part of a fourth wall portion 17D, and the opening 332 exposes a part of a front end part of a third wall portion 17C, a part of a front end part of a second wall portion 17B.

According to the above configuration, the front pressing jig 351 can be brought into contact with a part of the front end part of the third wall portion 17C and a part of the front end part of the second wall portion 17B.

As shown in FIGS. 17 and 18, the third wall portion 17C is provided with a locking lance 21, and the housing 330 is provided with a locking wall 333 to be locked to the locking lance 21 and facing forward via the opening 332.

According to the above configuration, the front end part of the third wall portion 17C is easily contacted by the front pressing jig 351 since the front pressing jig 351 approaches a center from an outer edge of a region where the front pressing jig 351 is inserted.

Other Embodiments (1) Although the rear holder 31 is provided in the first to fourth embodiments, there is no limitation to this and no rear holder may be provided.

(2) Although the cover 48 is provided in the first to fourth embodiments, there is no limitation to this and no cover may be provided.

(3) Although the two sandwiching portions 18 including the upper and lower sandwiching portions 18A, 18B are provided in the first to fourth embodiments, there is no limitation to this and one, three or more sandwiching portions may be used.

(4) Although the locking projection 28, the partial lock receiving portion 26 and the full lock receiving portion 27 are provided in the first to fourth embodiments, there is no limitation to this and none of the locking projection, the partial lock receiving portion and the full lock receiving portion may be provided.

(5) Although two protrusions 52 are provided in the second embodiment, there is no limitation to this and one, three or more protrusions may be used.

LIST OF REFERENCE NUMERALS

10: connector
11: wire
12: terminal
13: core wire
14: insulation coating
15: terminal body
16: slide portion
17: connecting tube portion
17A: first wall portion
17B: second wall portion
17C: third wall portion
17D: fourth wall portion
18: sandwiching portion
18A: upper sandwiching portion
18B: lower sandwiching portion
19: contact piece
20: base portion
21: locking lance
23A: upper holding protrusion
23B: lower holding protrusion
25: pressurizing portion
25A: upper pressurizing portion
25B: lower pressurizing portion
26: partial lock receiving portion
27: full lock receiving portion
28: locking projection
29: accommodating portion
29B: second surface portion
30, 130, 230, 330: housing
31: rear holder
32, 132, 232, 332: opening
33, 333: locking wall
34: separation wall
35: partition wall
36: partial locking portion
37: full locking portion
38: lock receiving portion
39: insertion hole
40: front stop portion
41: receptacle
42A, 42B: projecting wall
45: pressing jig

46: press receiving portion
47: core wire guiding portion
48: cover
49: insertion hole
51, 151, 251, 351: front pressing jig
52: protrusion
53: guiding portion
54: step surface

What is claimed is:

1. A connector, comprising:
a terminal to be connected to a core wire located on an end part of a wire including the core wire; and
a housing including an accommodating portion for accommodating the terminal,
the terminal including a terminal body having a sandwiching portion and a slide portion for sandwiching the core wire by the sandwiching portion by being pressed and slid from behind with respect to the terminal body,
the housing including an opening,
the opening exposing a part of a front end part of the terminal body to front,
the terminal body including a connecting tube portion,
the connecting tube portion having a first wall portion provided with a contact piece configured to contact a mating terminal inserted into the connecting tube portion, and
the housing including a front stop portion for covering at least a part of a front end part of the first wall portion.

2. The connector of claim 1, wherein:
the housing is covered by a cover, and
the cover covers the opening from front and includes a guiding portion for guiding insertion of a mating terminal into the terminal body.

3. The connector of claim 1, wherein:
the slide portion is movable in a front-rear direction between a first position and a second position forward of the first position while being externally fit to a region where the sandwiching portion is provided,
the slide portion includes a pressurizing portion for pressing the sandwiching portion toward the core wire at the second position, and
the slide portion is provided with a press receiving portion for moving the slide portion from the first position to the second position by being pressed from behind.

4. The connector of claim 1, wherein:
the connecting tube portion has a second wall portion facing the first wall portion and a third wall portion and a fourth wall portion connecting both side edge parts of the first wall portion and both side edge parts of the second wall portion,
the front stop portion covers a front end part of the fourth wall portion, and
the opening exposes a part of a front end part of the third wall portion and a part of a front end part of the second wall portion.

5. The connector of claim 4, wherein:
the third wall portion is provided with a locking lance, and
the housing is provided with a locking wall to be locked to the locking lance, the locking wall facing forward via the opening.

6. The connector of claim 1, wherein:
the connecting tube portion has a second wall portion facing the first wall portion and a third wall portion and a fourth wall portion connecting both side edge parts of the first wall portion and both side edge parts of the second wall portion, and
the opening exposes a part of a front end part of the third wall portion, a part of a front end part of the fourth wall portion and a front end part of the second wall portion.

7. The connector of claim 6, wherein:
an inner surface facing the second wall portion, out of inner surfaces constituting the accommodating portion, serves as a second surface portion, and
the second surface portion is provided with a protrusion configured to come into contact with the second wall portion.

8. The connector of claim 6, wherein:
an inner surface facing the second wall portion, out of inner surfaces constituting the accommodating portion, serves as a second surface portion, and
the second surface portion is connected to the opening via a step surface.

9. A connector manufacturing method for a connector with:
a terminal to be connected to a core wire located on an end part of a wire including the core wire; and
a housing including an accommodating portion for accommodating the terminal,
the terminal including a terminal body having a sandwiching portion and a slide portion for sandwiching the core wire by the sandwiching portion by being pressed and slid from behind with respect to the terminal body,
the housing including an opening, and
the opening exposing a part of a front end part of the terminal body to front,
the connector manufacturing method, comprising:
accommodating the terminal into the accommodating portion of the housing;
inserting the wire having the core wire exposed therefrom into the terminal body;
bringing a front pressing jig into contact with a part of a front end part of the terminal body exposed to front in the opening from front; and
sandwiching the core wire of the wire by the sandwiching portion of the terminal body by pressing the slide portion from behind.

* * * * *